(12) United States Patent
Jamieson et al.

(10) Patent No.: US 12,136,054 B2
(45) Date of Patent: Nov. 5, 2024

(54) SYSTEMS AND METHODS OF ITERATIVE WELL PLANNING FOR OPTIMIZED RESULTS

(71) Applicant: HELMERICH & PAYNE TECHNOLOGIES, LLC, Tulsa, OK (US)

(72) Inventors: Angus Lamberton Jamieson, Inverness (GB); Andrew Evan McGregor, Inverness (GB); Todd W. Benson, Dallas, TX (US)

(73) Assignee: HELMERICH & PAYNE TECHNOLOGIES, LLC, Tulsa, OK (US)

( * ) Notice: Subject to any disclaimer, the term of this patent is extended or adjusted under 35 U.S.C. 154(b) by 402 days.

(21) Appl. No.: 17/656,223

(22) Filed: Mar. 23, 2022

(65) Prior Publication Data
US 2022/0253761 A1 Aug. 11, 2022

Related U.S. Application Data

(63) Continuation-in-part of application No. 16/667,624, filed on Oct. 29, 2019, now Pat. No. 11,313,217.

(60) Provisional application No. 62/889,962, filed on Aug. 21, 2019, provisional application No. 62/863,619, filed on Jun. 19, 2019.

(51) Int. Cl.
*G06Q 10/0633* (2023.01)
*E21B 44/00* (2006.01)
*G06Q 50/02* (2024.01)

(52) U.S. Cl.
CPC ......... *G06Q 10/0633* (2013.01); *E21B 44/00* (2013.01); *G06Q 50/02* (2013.01)

(58) Field of Classification Search
CPC ..... G06Q 10/0633; G06Q 50/02; E21B 44/00
See application file for complete search history.

(56) References Cited

U.S. PATENT DOCUMENTS 11,313,217 B2 4/2022 Jamieson et al.
2001/0042642 A1 11/2001 King
(Continued)

FOREIGN PATENT DOCUMENTS

GB 2448622 A 10/2008
WO 8702408 A1 4/1987
WO 2020167349 A1 8/2020

OTHER PUBLICATIONS

U.S. Appl. No. 16/667,624, "Corrected Notice of Allowability", Dec. 30, 2021, 2 pages.
(Continued)

*Primary Examiner* — Manuel A Rivera Vargas
(74) *Attorney, Agent, or Firm* — Kilpatrick Townsend & Stockton LLP

(57) ABSTRACT

Systems and methods of surface steering control of drilling may be used together with systems and methods for planning one or more wells before drilling, planning a well path during drilling and/or updating that well plan and/or other well plans during the drilling of a well. The methods and systems may include planning a field, comprising a plurality of wells to be drilled and/or a plurality of pads from which a plurality of wells are to be drilled, planning a pad from which a plurality of wells are to be drilled, and planning a well both before and during drilling of the well.

27 Claims, 23 Drawing Sheets

(56) References Cited

U.S. PATENT DOCUMENTS

| | | |
|---|---|---|
| 2005/0211468 A1 | 9/2005 | Veeningen et al. |
| 2010/0185395 A1 | 7/2010 | Pirovolou et al. |
| 2015/0039281 A1 | 2/2015 | Meyer et al. |
| 2015/0317585 A1 | 11/2015 | Panchal et al. |
| 2016/0047206 A1* | 2/2016 | Vempati ................. G06F 30/23 703/7 |
| 2018/0075544 A1* | 3/2018 | Passolt ................... E21B 41/00 |
| 2018/0087351 A1 | 3/2018 | Johnston et al. |
| 2019/0169986 A1* | 6/2019 | Storm, Jr. .............. G01V 11/00 |
| 2020/0175443 A1* | 6/2020 | Fox .................... G06Q 10/0633 |
| 2020/0256181 A1 | 8/2020 | Jamieson et al. |

OTHER PUBLICATIONS

U.S. Appl. No. 16/667,624, "Non-Final Office Action", Jun. 25, 2021, 9 pages.

U.S. Appl. No. 16/667,624, "Notice of Allowance", Dec. 22, 2021, 9 pages.

PCT/US2019/058629, "International Preliminary Report on Patentability", Aug. 26, 2021, 9 pages.

PCT/US2019/058629, "International Search Report and Written Opinion", Jan. 27, 2020, 10 pages.

EP19915088.9, "Extended European Search Report", Oct. 13, 2022, 10 pages.

PCT/US2023/064317, "International Search Report and Written Opinion", Jun. 13, 2023, 12 pages.

\* cited by examiner

SYSTEMS AND METHODS OF ITERATIVE WELL PLANNING FOR OPTIMIZED RESULTS

CROSS-REFERENCES TO RELATED APPLICATIONS

This application is a continuation-in-part of and claims the benefit of priority to U.S. patent application Ser. No. 16/667,624, filed on Oct. 29, 2019, which in turn claims the benefit of priority to U.S. provisional patent application Ser. No. 62/863,619, filed on Jun. 19, 2019, and U.S. provisional patent application Ser. No. 62/889,962, filed on Aug. 21, 2019, each of which is hereby incorporated by reference as if fully set forth herein.

BACKGROUND

Field of the Disclosure

The present disclosure provides systems and methods useful for iterative well planning for optimized results. The systems and methods can be computer-implemented using processor executable instructions for execution on a processor and can accordingly be executed with a programmed computer system.

Description of the Related Art

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Conventional technologies and methods may not adequately address the complicated nature of drilling, and may not be capable of gathering and processing various information from downhole sensors and surface control systems in a timely manner, in order to improve drilling operations and minimize drilling errors.

During planning and preparation of drilling a well, a well plan may be created in order to guide and specify drilling operations in various sections of the well. Various methods may be used to optimize drilling parameters and drilling operations in the well plan. However, different optimizations may result in different economic value in terms of actual production from the well.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
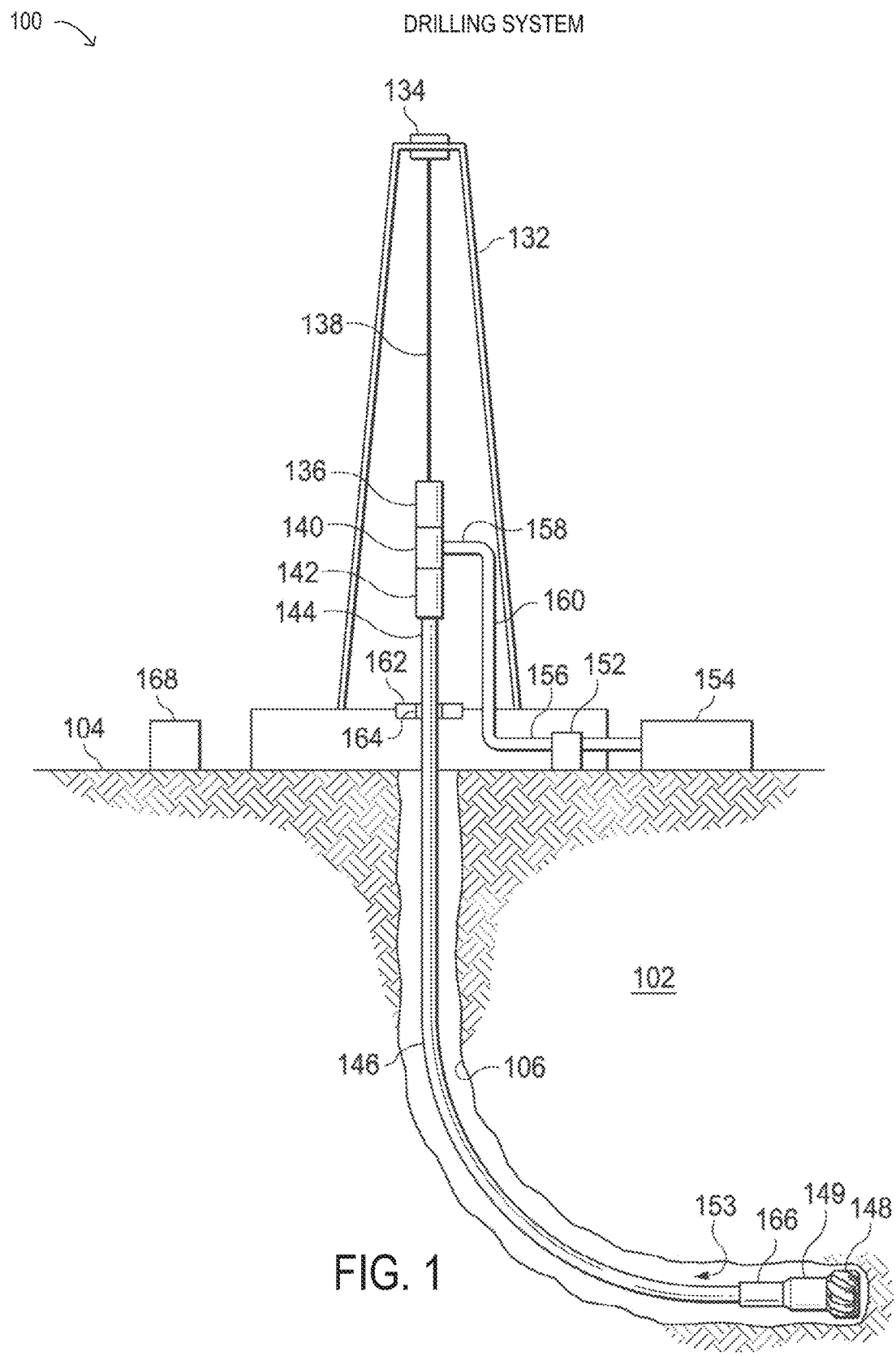
FIG. 1 is a depiction of a drilling system for drilling a borehole.

In the following description, details are set forth by way of example to facilitate discussion of the disclosed subject matter. It is noted, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Drilling a well typically involves a substantial amount of human decision-making during the drilling process. For example, geologists and drilling engineers use their knowledge, experience, and the available information to make decisions on how to plan the drilling operation, how to accomplish the drilling plan, and how to handle issues that arise during drilling. However, even the best geologists and drilling engineers perform some guesswork due to the unique nature of each borehole. Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve desirable drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes, because drilling errors can add significant cost to drilling operations. In some cases, drilling errors may permanently lower the output of a well, resulting in substantial long term economic losses due to the lost output of the well.

Accordingly, methods and systems are disclosed herein for iterative well planning for optimized results that balance decisions to minimize costs and maximize expected production in order to maximize the overall expected value of the well.

Referring now to the drawings, Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a traveling block 136 is coupled via a drilling line 138. In drilling system 100, a top drive 140 is coupled to traveling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture 153 (e.g., a mud mixture) from a mud pit 154 into drill string 146. Mud pit 154 is shown schematically as a container, but it is noted that various receptacles, tanks, pits, or other containers may be used. Mud 153 may flow from mud pump 152 into a discharge line 156 that is coupled to a rotary hose 158 by a standpipe 160. Rotary hose 158 may then be coupled to top drive 140, which includes a passage for mud 153 to flow into borehole 106 via drill string 146 from where mud 153 may emerge at drill bit 148. Mud 153 may lubricate drill bit 148 during drilling and, due to the pressure supplied by mud pump 152, mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and BHA 149 and is configured to rotate drill string 146 and apply pressure to drill bit 148. Drilling system 100 may include control systems such as a WOB/differential pressure control system 522, a positional/rotary control system 524, a fluid circulation control system 526, and a sensor system 528, as further described below with respect to FIG. 5. The control systems may be used to monitor and change drilling rig settings, such as the WOB or differential pressure to alter the ROP or the radial orientation of the tool face, change the flow rate of drilling mud, and perform other operations. Sensor system 528 may be for obtaining sensor data about the drilling operation and drilling system 100, including the downhole equipment. For example, sensor system 528 may include MWD or logging while drilling (LWD) tools for acquiring information, such as tool face and formation logging information, that may be saved for later retrieval, transmitted with or without a delay using any of various communication means (e.g., wireless, wireline, or mud pulse telemetry), or otherwise transferred to steering control system 168. As used herein, an MWD tool is enabled to communicate downhole measurements without substantial delay to the surface 104, such as using mud pulse telemetry, while a LWD tool is equipped with an internal memory that stores measurements when downhole and can be used to download a stored log of measurements when the LWD tool is at the surface 104. The internal memory in the LWD tool may be a removable memory, such as a universal serial bus (USB) memory device or another removable memory device. It is noted that certain downhole tools may have both MWD and LWD capabilities. Such information acquired by sensor system 528 may include information related to hole depth, bit depth, inclination angle, azimuth angle, true vertical depth, gamma count, standpipe pressure, mud flow rate, rotary rotations per minute (RPM), bit speed, ROP, WOB, among other information. It is noted that all or part of sensor system 528 may be incorporated into a control system, or in another component of the drilling equipment. As drilling system 100 can be configured in many different implementations, it is noted that different control systems and subsystems may be used.

Sensing, detection, measurement, evaluation, storage, alarm, and other functionality may be incorporated into a downhole tool 166 or BHA 149 or elsewhere along drill string 146 to provide downhole surveys of borehole 106. Accordingly, downhole tool 166 may be an MWD tool or a LWD tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a steering control system 168 on the surface 104. Steering control system 168 may be located in proximity to derrick 132 or may be included with drilling system 100. In other embodiments, steering control system 168 may be remote from the actual location of borehole 106 (see also FIG. 4). For example, steering control system 168 may be a stand-alone system or may be incorporated into other systems included with drilling system 100.

In operation, steering control system 168 may be accessible via a communication network (see also FIG. 10), and may accordingly receive formation information via the communication network. In some embodiments, steering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore, may be improved in accuracy using surface steering, as disclosed herein.

In particular embodiments, at least a portion of steering control system 168 may be located in downhole tool 166 (not shown). In some embodiments, steering control system 168 may communicate with a separate controller (not shown) located in downhole tool 166. In particular, steering control system 168 may receive and process measurements received from downhole surveys, and may perform the calculations described herein for surface steering using the downhole surveys and other information referenced herein.

In drilling system 100, to aid in the drilling process, data is collected from borehole 106, such as from sensors in BHA 149, downhole tool 166, or both. The collected data may include the geological characteristics of formation 102 in which borehole 106 was formed, the attributes of drilling system 100, including BHA 149, and drilling information such as weight-on-bit (WOB), drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first rate of penetration (ROP) through a first rock layer with a first WOB, while drilling from 1,200 feet to 1,500 feet occurred at a second ROP through a second rock layer with a second WOB (see also FIG. 2). In some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region, or at a database server accessible over the communication network that provides access to the database (see also FIG. 4). At drilling system 100, the collected data may be stored at the surface 104 or downhole in drill string 146, such as in a memory device included with BHA 149 (see also FIG. 10). Alternatively, at least a portion of the collected data may be stored on a removable storage medium, such as using steering control system 168 or BHA 149, that is later coupled to the database in order to transfer the collected data to the database, which may be manually performed at certain intervals, for example.

In FIG. 1, steering control system 168 is located at or near the surface 104 where borehole 106 is being drilled. Steering control system 168 may be coupled to equipment used in drilling system 100 and may also be coupled to the database, whether the database is physically located locally, regionally, or centrally (see also FIGS. 4 and 5). Accordingly, steering control system 168 may collect and record various inputs, such as measurement data from a magnetometer and an accelerometer that may also be included with BHA 149.

Steering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by steering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, steering control system 168 may present various information, such as using a graphical user interface (GUI) displayed on a display device (see FIG. 8), to a human operator, and may provide controls that enable the human operator to perform a control operation. The information presented to the user may include live measurements and feedback from the drilling rig and steering control system 168, or the drilling rig itself, and may further include limits and safety-related elements to prevent unwanted actions or equipment states, in response to a manual control command entered by the user using the GUI.

To implement semi-automatic control, steering control system 168 may itself propose or indicate to the user, such as via the GUI, that a certain control operation, or a sequence of control operations, should be performed at a given time. Then, steering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that steering control system 168 may execute semi-automatic control using a secondary processor, such as an embedded controller that executes under a real-time operating system (RTOS), that is under the control and command of steering control system 168. To implement automatic control, the step of manual starting the indicated control operation or sequence of operations is eliminated, and steering control system 168 may proceed with only a passive notification to the user of the actions taken.

In order to implement various control operations, steering control system 168 may perform (or may cause to be performed) various input operations, processing operations, and output operations. The input operations performed by steering control system 168 may result in measurements or other input information being made available for use in any subsequent operations, such as processing or output operations. The input operations may accordingly provide the input information, including feedback from the drilling process itself, to steering control system 168. The processing operations performed by steering control system 168 may be any processing operation associated with surface steering, as disclosed herein. The output operations performed by steering control system 168 may involve generating output information for use by external entities, or for output to a user, such as in the form of updated elements in the GUI, for example. The output information may include at least some of the input information, enabling steering control system 168 to distribute information among various entities and processors.

In particular, the operations performed by steering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, steering control system 168 may receive input information either before drilling, during drilling, or after drilling of borehole 106. The input information may comprise measurements from one or more sensors, as well as survey information collected while drilling borehole 106. The input information may also include a well plan, a regional formation history, drilling engineer parameters, downhole tool face/inclination information, downhole tool gamma/resistivity information, economic parameters, reliability parameters, among various other parameters. Some of the input information, such as the regional formation history, may be available from a drilling hub 410, which may have respective access to a regional drilling database (DB) 412 (see FIG. 4). Other input information may be accessed or uploaded from other sources to steering control system 168. For example, a web interface may be used to interact directly with steering control system 168 to upload the well plan or drilling parameters.

As noted, the input information may be provided to steering control system 168. After processing by steering control system 168, steering control system 168 may generate control information that may be output to drilling rig 210 (e.g., to rig controls 520 that control drilling equipment 530, see also FIGS. 2 and 5). Drilling rig 210 may provide feedback information using rig controls 520 to steering control system 168. The feedback information may then serve as input information to steering control system 168, thereby enabling steering control system 168 to perform feedback loop control and validation. Accordingly, steering control system 168 may be configured to modify its output information to the drilling rig, in order to achieve the desired results, which are indicated in the feedback information. The output information generated by steering control system 168 may include indications to modify one or more drilling parameters, the direction of drilling, the drilling mode, among others. In certain operational modes, such as semi-automatic or automatic, steering control system 168 may generate output information indicative of instructions to rig controls 520 to enable automatic drilling using the latest location of BHA 149. Therefore, an improved accuracy in the determination of the location of BHA 149 may be provided using steering control system 168, along with the methods and operations for surface steering disclosed herein.

Figure 2:
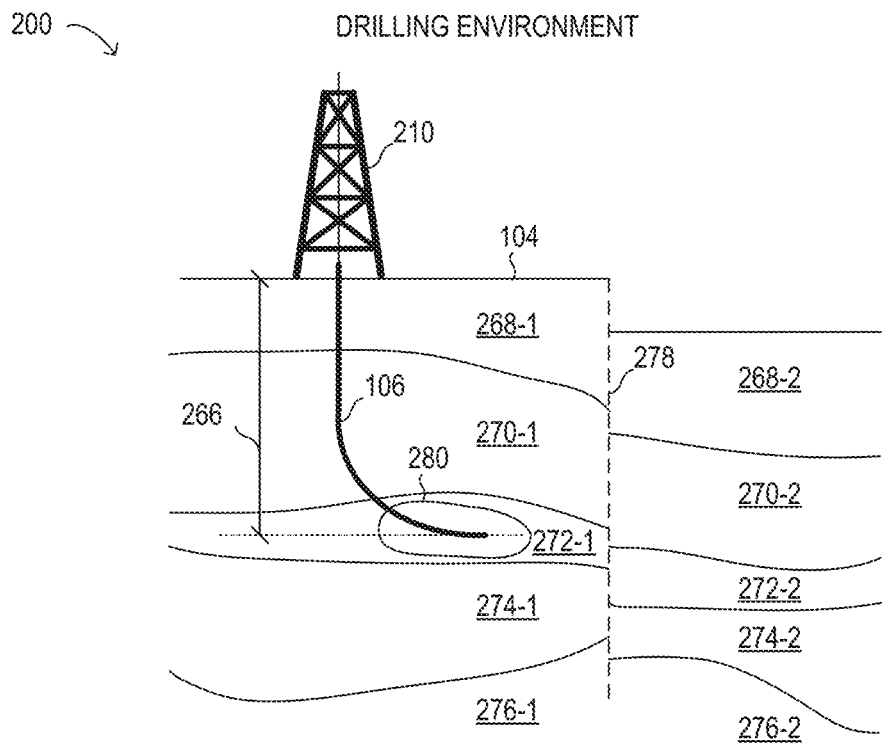
FIG. 2 is a depiction of a drilling environment including the drilling system for drilling a borehole.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drilling plan (also referred to as a well plan) has been formulated to drill borehole 106 extending into the ground to a true vertical depth (TVD) 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata layers 274-1 and 276-1. A target area 280 specified in the drilling plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size, and may be defined using various different methods and information in different embodiments. In some instances, target area 280 may be specified in the drilling plan using subsurface coordinates, or references to certain markers, that indicate where borehole 106 is to be terminated. In other instances, target area may be specified in the drilling plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 172 as far as possible, target area 280 may be defined as strata layer 272-1 itself and drilling may continue until some other physical limit is reached, such as a property boundary or a physical limitation to the length of the drill string.

Also visible in FIG. 2 is a fault line 278 that has resulted in a subterranean discontinuity in the fault structure. Specifically, strata layers 268, 270, 272, 274, and 276 have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, 270-3, 272-3, 274-3, and 276-3 are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used alter an angle of borehole 106 to accommodate subterranean faults, such as indicated by fault line 278 in FIG. 2. Other benefits that may be achieved using directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not limited to a straight horizontal borehole 106, but may involve staying within a strata layer that varies in depth and thickness as illustrated by strata layer 172. As such, directional drilling may involve multiple vertical adjustments that complicate the trajectory of borehole 106.

Figure 3:
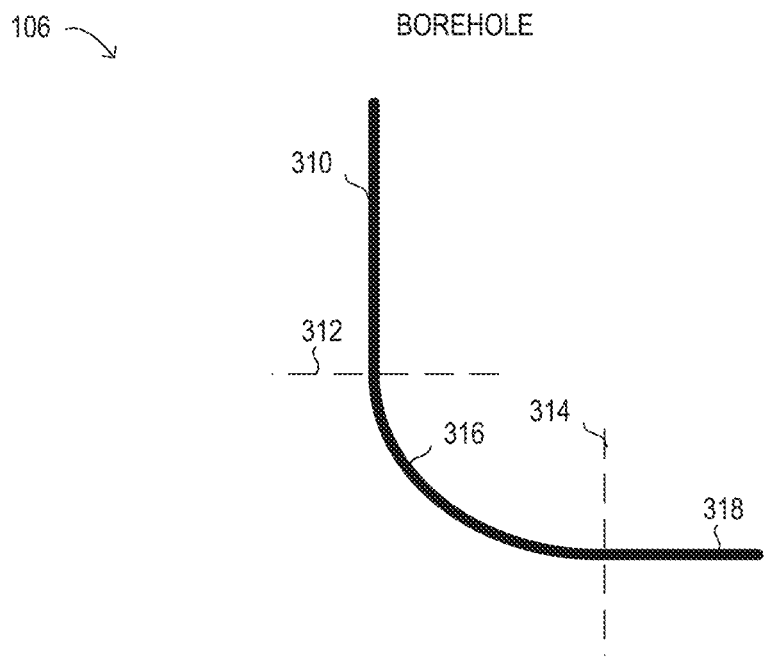
FIG. 3 is a depiction of a borehole generated in the drilling environment.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kick off point 312 in vertical portion 310 and may end at a begin point 314 of horizontal portion 318. The change in inclination in build up section 316 per measured length drilled is referred to herein as a "build rate" and may be defined in degrees per one hundred feet drilled. For example, the build rate may have a value of 6°/100 feet, indicating that there is a six degree change in inclination for every one hundred feet drilled. The build rate for a particular build up section may remain relatively constant or may vary.

The build rate used for any given build up section may depend on various factors, such as properties of the formation (i.e., strata layers) through which borehole 106 is to be drilled, the trajectory of borehole 106, the particular pipe and drill collars/BHA components used (e.g., length, diameter, flexibility, strength, mud motor bend setting, and drill bit), the mud type and flow rate, the specified horizontal displacement, stabilization, and inclination, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 146 may be backed out of a portion of borehole 106 and redrilled along a different path. Such mistakes may be undesirable due to the additional time and expense involved. However, if the built rate is too cautious, additional overall time may be added to the drilling process, because directional drilling generally involves a lower ROP than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding", are commonly used to form borehole 106. Rotating, also called "rotary drilling", uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at BHA 149. The mud motor may have an adjustable bent housing and is not powered by rotation of the drill string. Instead, the mud motor uses hydraulic power derived from the pressurized drilling mud that circulates along borehole 106 to and from the surface 104 to directionally drill borehole 106 in build up section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, WOB, and vibration, among other adjustments. The adjustments may continue until a tool face is confirmed that indicates a direction of the bend of the mud motor is oriented to a direction of a desired deviation (i.e., build rate) of borehole 106. Once the desired orientation of the mud motor is attained, WOB to the drill bit is increased, which causes the drill bit to move in the desired direction of deviation. Once sufficient distance and angle have been built up in the curved trajectory, a transition back to rotating mode can be accomplished by rotating the drill string again. The rotation of the drill string after sliding may neutralize the directional deviation caused by the bend in the mud motor due to the continuous rotation around a centerline of borehole 106.

Figure 4:
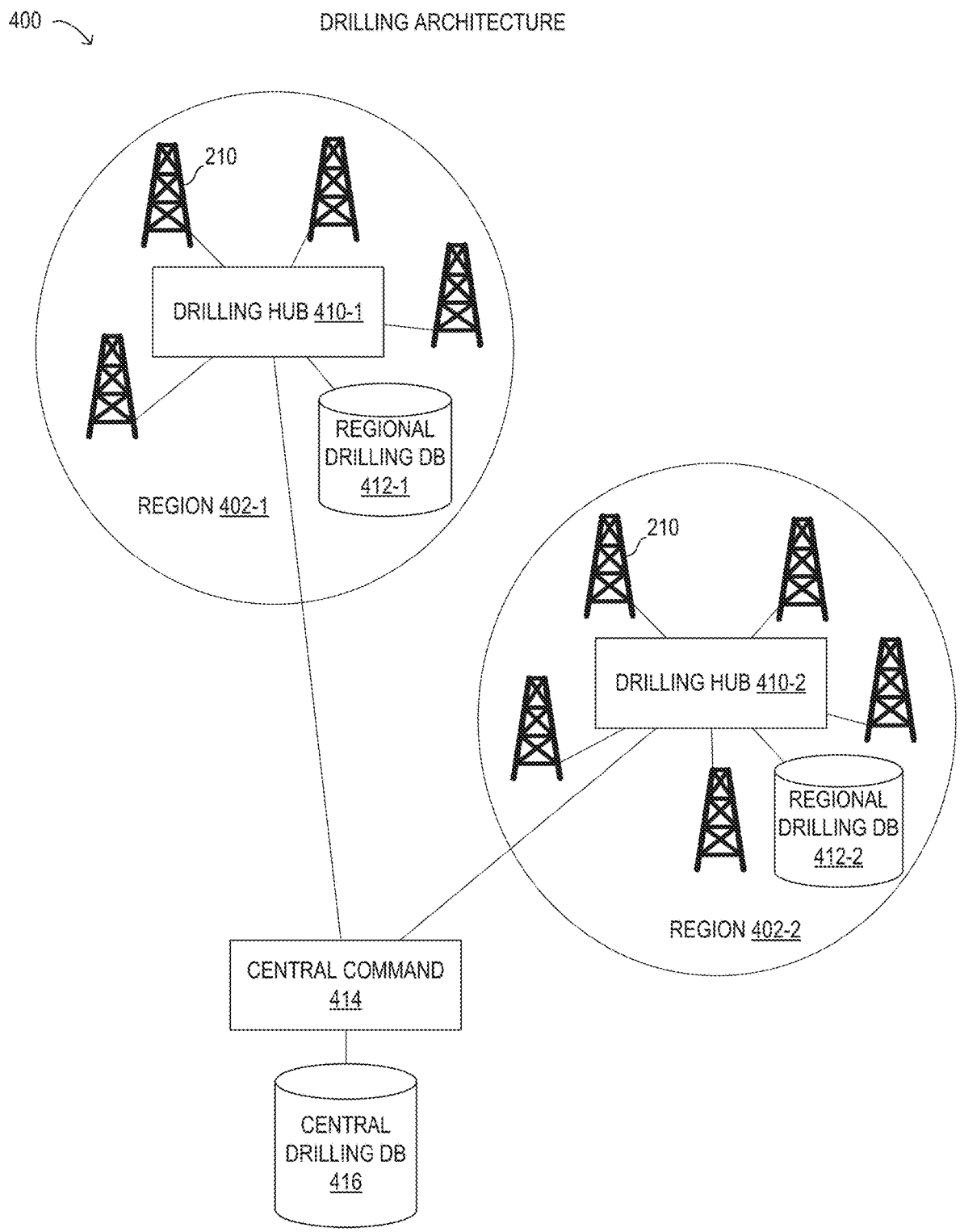
FIG. 4 is a depiction of a drilling architecture including the drilling environment.

Referring now to FIG. 4, a drilling architecture 400 is illustrated in diagram form. As shown, drilling architecture 400 depicts a hierarchical arrangement of drilling hubs 410 and a central command 414, to support the operation of a plurality of drilling rigs 210 in different regions 402. Specifically, as described above with respect to FIGS. 1 and 2, drilling rig 210 includes steering control system 168 that is enabled to perform various drilling control operations locally to drilling rig 210. When steering control system 168 is enabled with network connectivity, certain control operations or processing may be requested or queried by steering control system 168 from a remote processing resource. As shown in FIG. 4, drilling hubs 410 represent a remote processing resource for steering control system 168 located at respective regions 402, while central command 414 may represent a remote processing resource for both drilling hub 410 and steering control system 168.

Specifically, in a region 401-1, a drilling hub 410-1 may serve as a remote processing resource for drilling rigs 210 located in region 401-1, which may vary in number and are not limited to the exemplary schematic illustration of FIG. 4. Additionally, drilling hub 410-1 may have access to a regional drilling DB 412-1, which may be local to drilling hub 410-1. Additionally, in a region 401-2, a drilling hub 410-2 may serve as a remote processing resource for drilling rigs 210 located in region 401-2, which may vary in number and are not limited to the exemplary schematic illustration of FIG. 4. Additionally, drilling hub 410-2 may have access to a regional drilling DB 412-2, which may be local to drilling hub 410-2.

In FIG. 4, respective regions 402 may exhibit the same or similar geological formations. Thus, reference wells, or offset wells, may exist in a vicinity of a given drilling rig 210 in region 402, or where a new well is planned in region 402. Furthermore, multiple drilling rigs 210 may be actively drilling concurrently in region 402, and may be in different stages of drilling through the depths of formation strata layers at region 402. Thus, for any given well being drilled by drilling rig 210 in a region 402, survey data from the reference wells or offset wells may be used to create the well plan, and may be used for surface steering, as disclosed herein. In some implementations, survey data or reference data from a plurality of reference wells may be used to improve drilling performance, such as by reducing an error in estimating TVD or a position of BHA 149 relative to one or more strata layers, as will be described in further detail herein. Additionally, survey data from recently drilled wells, or wells still currently being drilled, including the same well, may be used for reducing an error in estimating TVD or a position of BHA 149 relative to one or more strata layers.

Also shown in FIG. 4 is central command 414, which has access to central drilling DB 416, and may be located at a centralized command center that is in communication with drilling hubs 410 and drilling rigs 210 in various regions 402. The centralized command center may have the ability to monitor drilling and equipment activity at any one or more drilling rigs 210. In some embodiments, central command 414 and drilling hubs 412 may be operated by a commercial operator of drilling rigs 210 as a service to customers who have hired the commercial operator to drill wells and provide other drilling-related services.

In FIG. 4, it is particularly noted that central drilling DB 416 may be a central repository that is accessible to drilling hubs 410 and drilling rigs 210. Accordingly, central drilling DB 416 may store information for various drilling rigs 210 in different regions 402. In some embodiments, central drilling DB 416 may serve as a backup for at least one regional drilling DB 412, or may otherwise redundantly store information that is also stored on at least one regional drilling DB 412. In turn, regional drilling DB 412 may serve as a backup or redundant storage for at least one drilling rig 210 in region 402. For example, regional drilling DB 412 may store information collected by steering control system 168 from drilling rig 210.

In some embodiments, the formulation of a drilling plan for drilling rig 210 may include processing and analyzing the collected data in regional drilling DB 412 to create a more effective drilling plan. Furthermore, once the drilling has begun, the collected data may be used in conjunction with current data from drilling rig 210 to improve drilling decisions. As noted, the functionality of steering control system 168 may be provided at drilling rig 210, or may be provided, at least in part, at a remote processing resource, such as drilling hub 410 or central command 414.

As noted, steering control system 168 may provide functionality as a surface steerable system for controlling drilling rig 210. Steering control system 168 may have access to regional drilling DB 412 and central drilling DB 416 to provide the surface steerable system functionality.

As will be described in greater detail below, steering control system 168 may be used to plan and control drilling operations based on input information, including feedback from the drilling process itself. Steering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
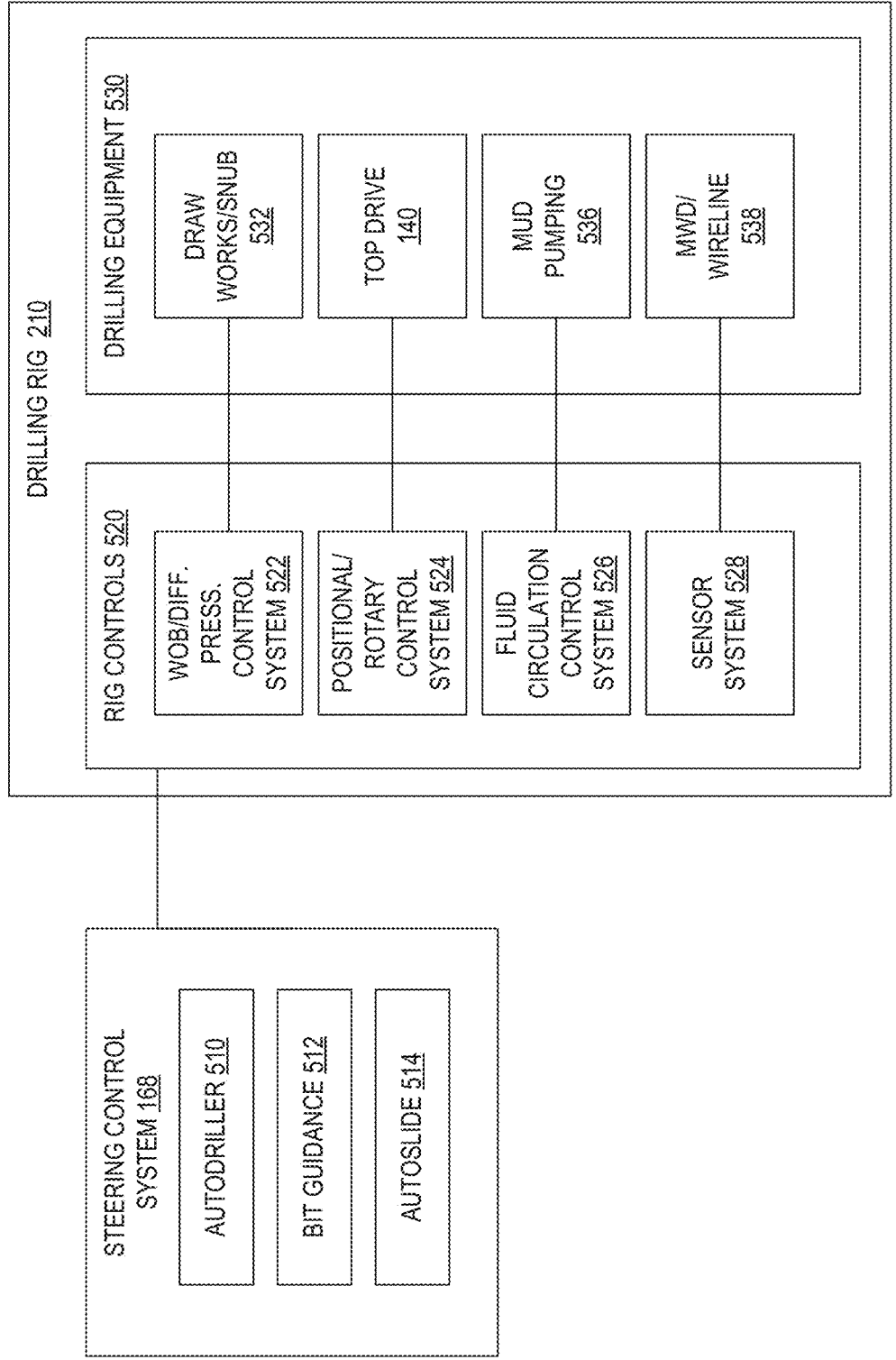
FIG. 5 is a depiction of rig control systems included in the drilling system.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, a mud pumping 536, and an MWD/wireline 538.

Figure 10:
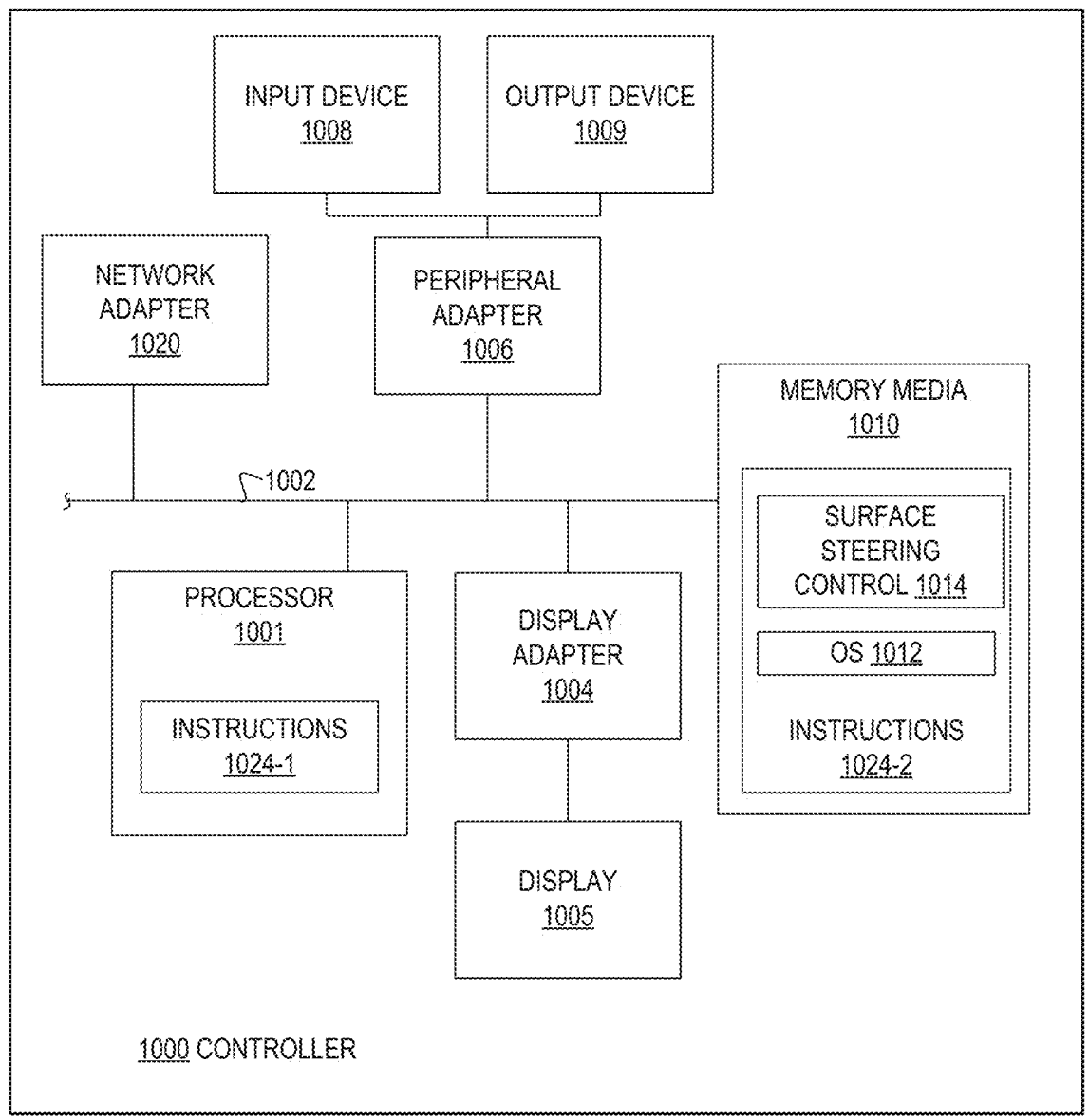
FIG. 10 is a depiction of a controller usable by the rig control systems.

Steering control system 168 represent an instance of a processor having an accessible memory storing instructions executable by the processor, such as an instance of controller 1000 shown in FIG. 10. Also, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Steering control system 168 may represent hardware that executes instructions to implement a surface steerable system that provides feedback and automation capability to an operator, such as a driller. For example, steering control system 168 may cause autodriller 510, bit guidance 512 (also referred to as a bit guidance system (BGS)), and autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling, and may include certain levels of automation with respect to drilling equipment 530.

In rig control systems 500 of FIG. 5, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping 536 to control mud flow and may also receive and decode mud telemetry signals. Sensor system 528 may be interfaced with MWD/wireline 538, which may represent various BHA sensors and instrumentation equipment, among other sensors that may be downhole or at the surface.

In rig control systems 500, autodriller 510 may represent an automated rotary drilling system and may be used for controlling rotary drilling. Accordingly, autodriller 510 may enable automate operation of rig controls 520 during rotary drilling, as indicated in the well plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide, and may return control to steering control system 168 for rotary drilling at an appropriate time, as indicated in the well plan. In particular implementations, autoslide 514 may be enabled to provide a user interface during slide drilling to specifically monitor and control the slide. For example, autoslide 514 may rely on bit guidance 512 for orienting a tool face and on autodriller 510 to set WOB or control rotation or vibration of drill string 146.

Figure 6:
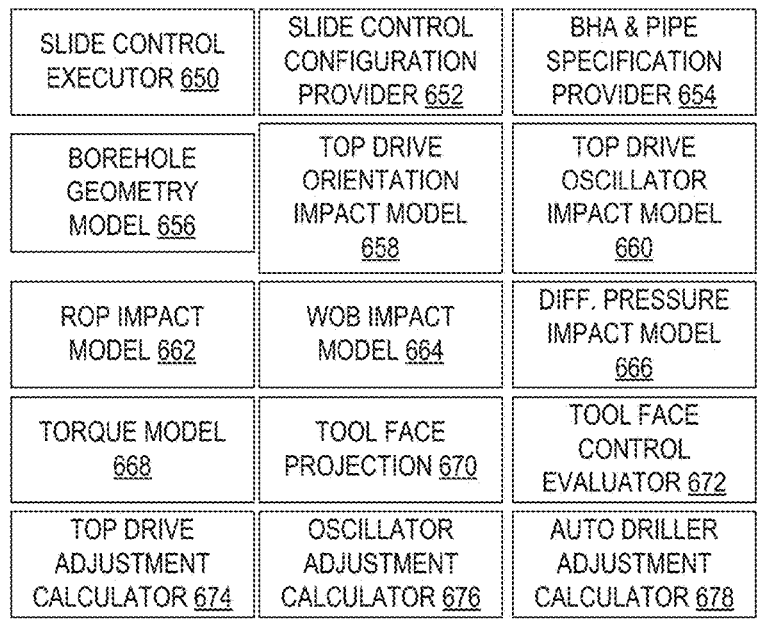
FIG. 6 is a depiction of algorithm modules used by the rig control systems.

FIG. 6 illustrates one embodiment of control algorithm modules 600 used with steering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a BHA & pipe specification provider 654 that is responsible for managing and providing details of BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the tool face control; a top drive oscillator impact model 660 that is responsible for modeling the impact that oscillations of top drive 140 has had on the tool face control; an ROP impact model 662 that is responsible for modeling the effect on the tool face control of a change in ROP or a corresponding ROP set point; a WOB impact model 664 that is responsible for modeling the effect on the tool face control of a change in WOB or a corresponding WOB set point; a differential pressure impact model 666 that is responsible for modeling the effect on the tool face control of a change in differential pressure (DP) or a corresponding DP set point; a torque model 668 that is responsible for modeling the comprehensive representation of torque for surface, downhole, break over, and reactive torque, modeling impact of those torque values on tool face control, and determining torque operational thresholds; a tool face control evaluator 672 that is responsible for evaluating all factors impacting tool face control and whether adjustments need to be projected, determining whether re-alignment off-bottom is indicated, and determining off-bottom tool face operational threshold windows; a tool face projection 670 that is responsible for projecting tool face behavior for top drive 140, the top drive oscillator, and auto driller adjustments; a top drive adjustment calculator 674 that is responsible for calculating top drive adjustments resultant to tool face projections; an oscillator adjustment calculator 676 that is responsible for calculating oscillator adjustments resultant to tool face projections; and an autodriller adjustment calculator 678 that is responsible for calculating adjustments to autodriller 510 resultant to tool face projections.

Figure 7:
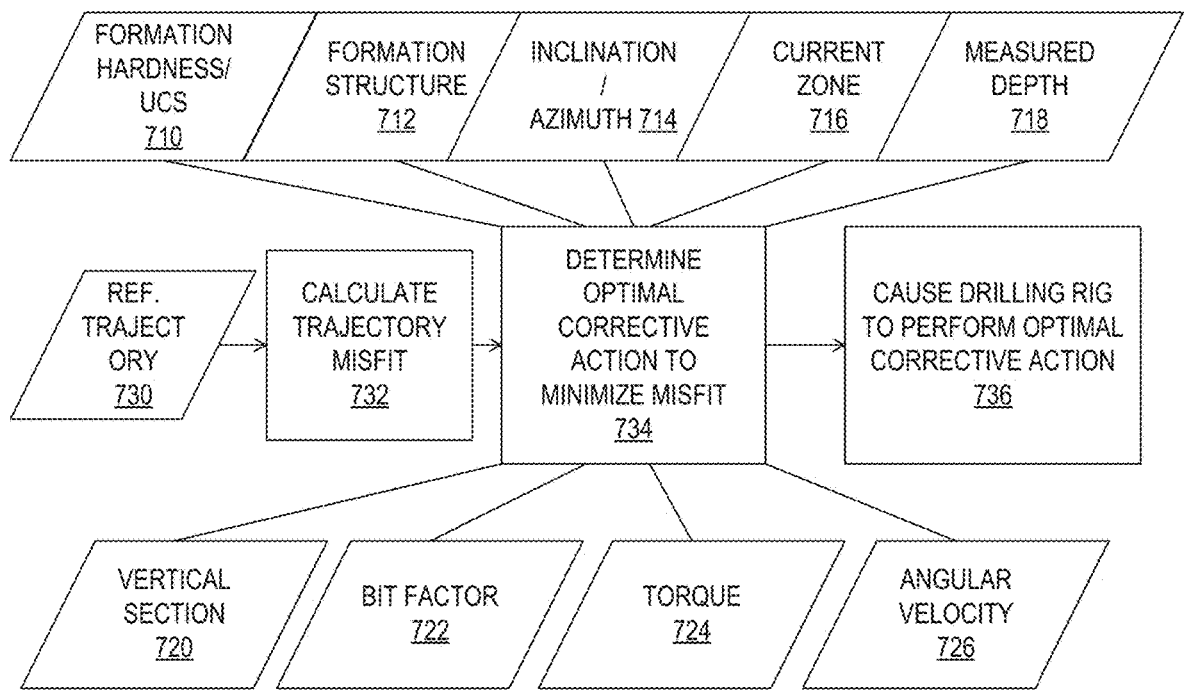
FIG. 7 is a depiction of a steering control process used by the rig control systems.

FIG. 7 illustrates one embodiment of a steering control process 700 for determining a corrective action for drilling. Steering control process 700 may be used for rotary drilling or slide drilling in different embodiments.

Steering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired tool face 730, vertical section 720, bit factor 722, mud motor torque 724, reference trajectory 730, vertical section 720, bit factor 722, torque 724 and angular velocity 726. In FIG. 7, reference trajectory 730 of borehole 106 is determined to calculate a trajectory misfit in a step 732. Step 732 may output the trajectory misfit to determine a corrective action to minimize the misfit at step 734, which may be performed using the other inputs described above. Then, at step 736, the drilling rig is caused to perform the corrective action.

It is noted that in some implementations, at least certain portions of steering control process 700 may be automated or performed without user intervention, such as using rig control systems 700 (see FIG. 7). In other implementations, the corrective action in step 736 may be provided or communicated (by display, SMS message, email, or otherwise) to one or more human operators, who may then take appropriate action. The human operators may be members of a rig crew, which may be located at or near drilling rig 210, or may be located remotely from drilling rig 210.

Figure 8:
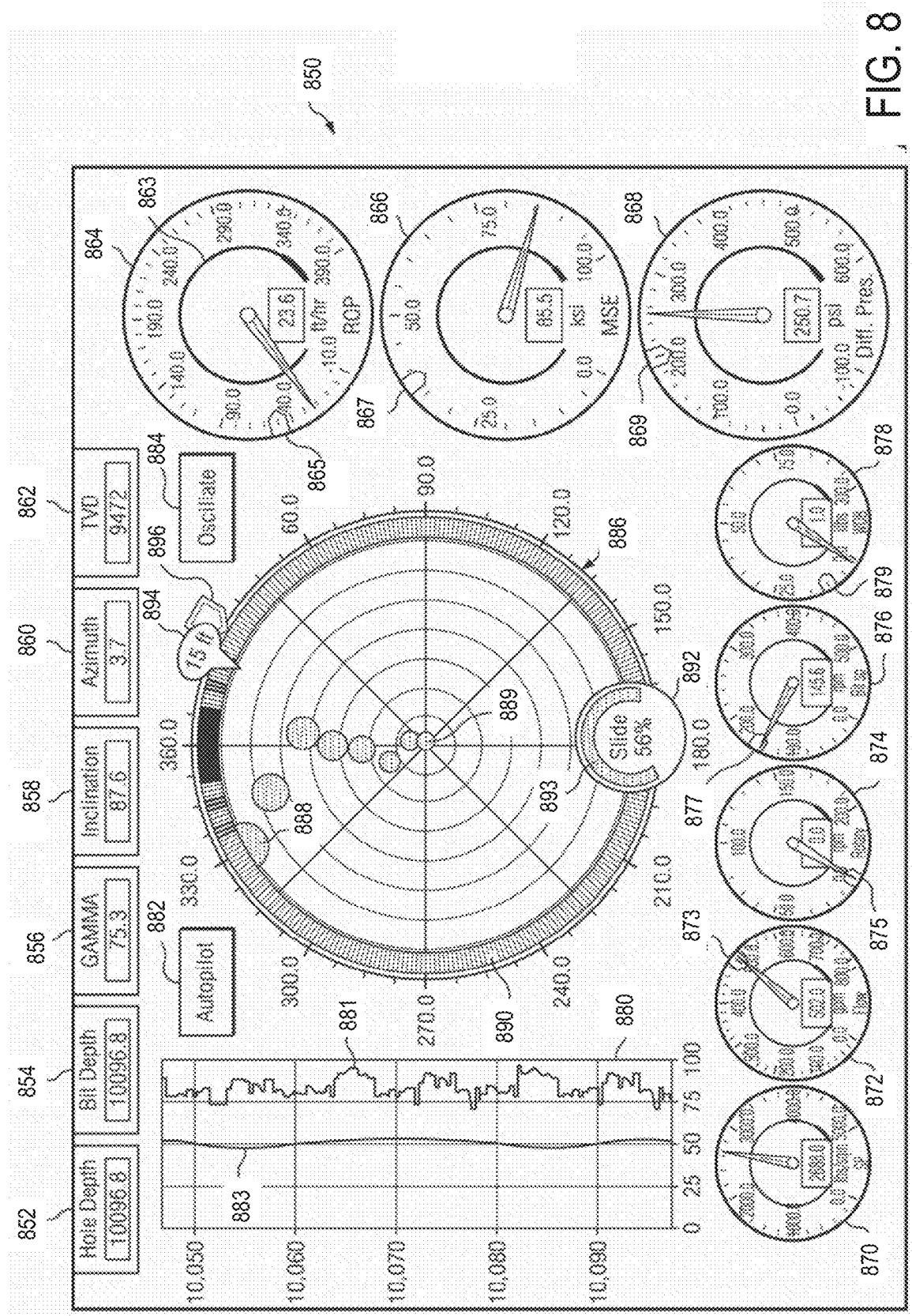
FIG. 8 is a depiction of a graphical user interface provided by the rig control systems.

Referring to FIG. 8, one embodiment of a user interface 850 that may be generated by steering control system 168 for monitoring and operation by a human operator is illustrated.

User interface 850 may provide many different types of information in an easily accessible format. For example, user interface 850 may be shown on a computer monitor, a television, a viewing screen (e.g., a display device) associated with steering control system 168.

As shown in FIG. 8, user interface 850 provides visual indicators such as a hole depth indicator 852, a bit depth indicator 854, a GAMMA indicator 856, an inclination indicator 858, an azimuth indicator 860, and a TVD indicator 862. Other indicators may also be provided, including a ROP indicator 864, a mechanical specific energy (MSE) indicator 866, a differential pressure indicator 868, a standpipe pressure indicator 870, a flow rate indicator 872, a rotary RPM (angular velocity) indicator 874, a bit speed indicator 876, and a WOB indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, ROP indicator 864 may include a marker 865 indicating that the target value is 50 feet/hour (or 15 m/h). MSE indicator 866 may include a marker 867 indicating that the target value is 37 ksi (or 255 MPa). Differential pressure indicator 868 may include a marker 869 indicating that the target value is 200 psi (or 1.38 kPa). ROP indicator 864 may include a marker 865 indicating that the target value is 50 feet/hour (or 15 m/h). Standpipe pressure indicator 870 may have no marker in the present example. Flow rate indicator 872 may include a marker 873 indicating that the target value is 500 gpm (or 31.5 L/s). Rotary RPM indicator 874 may include a marker 875 indicating that the target value is 0 RPM (e.g., due to sliding). Bit speed indicator 876 may include a marker 877 indicating that the target value is 150 RPM. WOB indicator 878 may include a marker 879 indicating that the target value is 10 klbs (or 4,500 kg).

Each indicator may also include a colored band, or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), ROP 883 (e.g., empirical ROP and normalized ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical tool face orientation information (e.g., which way the bend is pointed). For purposes of illustration, circular chart 886 represents three hundred and sixty degrees. A series of circles within circular chart 886 may represent a timeline of tool face orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular tool face orientation with little deviation. As shown in user interface 850, the color blue may extend from approximately 22-337 degrees, the color green may extend from approximately 15-22 degrees and 337-345 degrees, the color yellow may extend a few degrees around the 13 and 345 degree marks, while the color red may extend from approximately 347-10 degrees. Transition colors or shades may be used with, for example, the color orange marking the transition between red and yellow or a light blue marking the transition between blue and green. This color coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type.

In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., an ROP of 100 feet/hour). For example, ROP indicator 868 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). ROP indicator 868 may also display a marker at 100 feet/hour to indicate the desired target ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, steering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
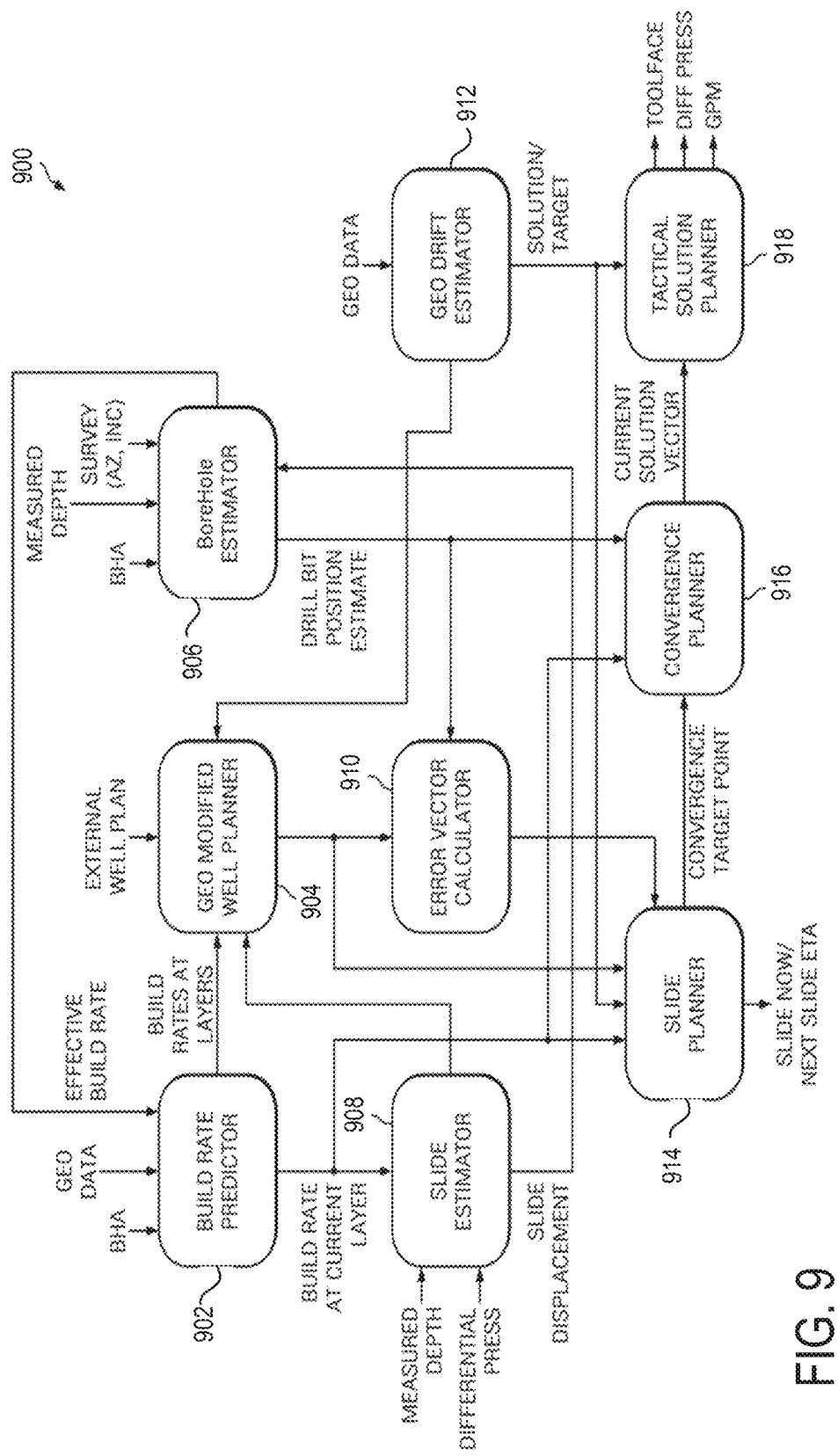
FIG. 9 is a depiction of a guidance control loop performed by the rig control systems.

Referring to FIG. 9, one embodiment of a guidance control loop (GCL) 900 is shown in further detail GCL 900 may represent one example of a control loop or control algorithm executed under the control of steering control system 168. GCL 900 may include various functional modules, including a build rate predictor 902, a geo modified well planner 904, a borehole estimator 906, a slide estimator 908, an error vector calculator 910, a geological drift estimator 912, a slide planner 914, a convergence planner 916, and a tactical solution planner 918. In the following description of GCL 900, the term "external input" refers to input received from outside GCL 900, while "internal input" refers to input exchanged between functional modules of GCL 900.

In FIG. 9, build rate predictor 902 receives external input representing BHA information and geological information, receives internal input from the borehole estimator 906, and provides output to geo modified well planner 904, slide estimator 908, slide planner 914, and convergence planner 916. Build rate predictor 902 is configured to use the BHA information and geological information to predict drilling build rates of current and future sections of borehole 106. For example, build rate predictor 902 may determine how aggressively a curve will be built for a given formation with BHA 149 and other equipment parameters.

In FIG. 9, build rate predictor 902 may use the orientation of BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90 degree angle may provide a good tool face and a clean drill entry, while approaching the rock layer at a 45 degree angle may build a curve relatively quickly. An angle of approach that is near parallel may cause drill bit 148 to skip off the upper surface of the strata layer of rock. Accordingly, build rate predictor 902 may calculate BHA orientation to account for formation transitions. Within a single strata layer, build rate predictor 902 may use the BHA orientation to account for internal layer characteristics (e.g., grain) to determine build rates for different parts of a strata layer. The BHA information may include bit characteristics, mud motor bend setting, stabilization and mud motor bit to bend distance. The geological information may include formation data such as compressive strength, thicknesses, and depths for formations encountered in the specific drilling location. Such information may enable a calculation-based prediction of the build rates and ROP that may be compared to both results obtained while drilling borehole 106 and regional historical results (e.g., from the regional drilling DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a well plan, internal input from build rate predictor 902 and geo drift estimator 912, and provides output to slide planner 914 and error vector calculator 910. Geo modified well planner 904 uses the input to determine whether there is a more desirable trajectory than that provided by the well plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide steering control system 168 with a target inclination as a set point for steering control system 168 to control. For example, the geologist may enter a target to steering control system 168 of 90.5-91.0 degrees of inclination for a section of borehole 106. Geo modified well planner 904 may then treat the target as a vector target, while remaining within the error limits of the original well plan. In some embodiments, geo modified well planner 904 may be an optional module that is not used unless the well plan is to be modified. For example, if the well plan is marked in steering control system 168 as non-modifiable, geo modified well planner 904 may be bypassed altogether or geo modified well planner 904 may be configured to pass the well plan through without any changes.

In FIG. 9, borehole estimator 906 may receive external inputs representing BHA information, measured depth information, survey information (e.g., azimuth and inclination), and may provide outputs to build rate predictor 902, error vector calculator 910, and convergence planner 916. Borehole estimator 906 may be configured to provide an estimate of the actual borehole and drill bit position and trajectory angle without delay, based on either straight line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface to the last survey location based on the collection of survey measurements. Also, borehole estimator 906 may take the slide estimate from slide estimator 908 (described below) and extend the slide estimate from the last survey point to a current location of drill bit 148. Using the combination of these two estimates, borehole estimator 906 may provide steering control system 168 with an estimate of the drill bit's location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample tool face orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the downhole survey sensor point passes the slide portion of the borehole, often resulting in a response lag defined by a distance of the sensor point from the drill bit tip (e.g., approximately 50 feet). Such a response lag may introduce inefficiencies in the slide cycles due to over/under correction of the actual trajectory relative to the planned trajectory.

In GCL 900, using slide estimator 908, each tool face update may be algorithmically merged with the average differential pressure of the period between the previous and current tool face readings, as well as the MD change during this period to predict the direction, angular deviation, and MD progress during the period. As an example, the periodic rate may be between 10 and 60 seconds per cycle depending on the tool face update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the well plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of ROP and BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost calculation and plan for sliding activity, which may include factoring in BHA wear, expected build rates of current and expected formations, and the well plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material (LCM) planner may be provided as part of slide planner 914 or elsewhere (e.g., as a stand-alone module or as part of another module described herein). The LCM planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

In FIG. 9, slide planner 914 may also look at the current position relative to the next connection. A connection may happen every 90 to 100 feet (or some other distance or distance range based on the particulars of the drilling operation) and slide planner 914 may avoid planning a slide when close to a connection or when the slide would carry through the connection. For example, if the slide planner 914 is planning a 50 foot slide but only 20 feet remain until the next connection, slide planner 914 may calculate the slide starting after the next connection and make any changes to the slide parameters to accommodate waiting to slide until after the next connection. Such flexible implementation avoids inefficiencies that may be caused by starting the slide, stopping for the connection, and then having to reorient the tool face before finishing the slide. During slides, slide planner 914 may provide some feedback as to the progress of achieving the desired goal of the current slide. In some embodiments, slide planner 914 may account for reactive torque in the drill string. More specifically, when rotating is occurring, there is a reactional torque wind up in drill string 146. When the rotating is stopped, drill string 146 unwinds, which changes tool face orientation and other parameters. When rotating is started again, drill string 146 starts to wind back up. Slide planner 914 may account for the reactional torque so that tool face references are maintained, rather than stopping rotation and then trying to adjust to a desired tool face orientation. While not all downhole tools may provide tool face orientation when rotating, using one that does supply such information for GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and desired convergence target point along the planned trajectory. The convergence plan may take account the amount of sliding/drilling ahead that has been planned to take place by slide planner 914. Convergence planner 916 may also use BHA orientation information for angle of attack calculations when determining convergence plans as described above with respect to build rate predictor 902. The solution provided by convergence planner 916 defines a new trajectory solution for the current position of drill bit 148. The solution may be immediate without delay, or planned for implementation at a future time that is specified in advance.

In FIG. 9, tactical solution planner 918 receives internal inputs from geological drift estimator 912 and convergence planner 916, and provides external outputs representing information such as tool face orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by GCL 900 in additional modules or added to an existing module. For example, there is a relationship between the rotational position of the drill pipe on the surface and the orientation of the downhole tool face. Accordingly, GCL 900 may receive information corresponding to the rotational position of the drill pipe on the surface. GCL 900 may use this surface positional information to calculate current and desired tool face orientations. These calculations may then be used to define control parameters for adjusting the top drive 140 to accomplish adjustments to the downhole tool face in order to steer the trajectory of borehole 106.

For purposes of example, an object-oriented software approach may be utilized to provide a class-based structure that may be used with GCL 900 or other functionality provided by steering control system 168. In GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a WOB/differential pressure model, a positional/rotary model, an MSE model, an active well plan, and control limits. The drilling model class may produce a control output solution and may be executed via a main processing loop that rotates through the various modules of GCL 900. The drill bit model may represent the current position and state of drill bit 148. The drill bit model may include a three dimensional (3D) position, a drill bit trajectory, BHA information, bit speed, and tool face (e.g., orientation information). The 3D position may be specified in north-south (NS), east-west (EW), and true vertical depth (TVD). The drill bit trajectory may be specified as an inclination angle and an azimuth angle. The BHA information may be a set of dimensions defining the active BHA. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents draw works or other WOB/differential pressure controls and parameters, including WOB. The positional/rotary model represents top drive or other positional/rotary controls and parameters including rotary RPM and spindle position.

The active well plan represents the target borehole path and may include an external well plan and a modified well plan. The control limits represent defined parameters that may be set as maximums and/or minimums. For example, control limits may be set for the rotary RPM in the top drive model to limit the maximum RPMs to the defined level. The control output solution may represent the control parameters for drilling rig 210.

Each functional module of GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, GCL 900 may rely on a programmable timer module that provides a timing mechanism to provide timer event signals to drive the main processing loop. While steering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of steering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing surface steering according to the present disclosure. In various embodiments, controller 1000 may represent an implementation of steering control system 168. In other embodiments, at least certain portions of controller 1000 may be used for control systems 510, 512, 514, 522, 524, and 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television or the like. Display device 1005 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and surface steering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing GCL 900, as mentioned previously, among other methods and operations disclosed herein.

The systems and methods described above may be used together with systems and methods for planning one or more wells before drilling, planning a well path during drilling and/or updating that well plan and/or other well plans during the drilling of a well. Methods and systems for planning a field (comprising a plurality of wells to be drilled and/or a plurality of pads from which a plurality of wells are to be drilled), planning a pad (from which a plurality of wells are to be drilled), and planning a well both before and during drilling of the well are now described. As detailed below, it may be helpful to plan fields, pads, and wells before and during drilling so as to optimize the placement of each well in the earth relative to one or more other wells and relative to one or more geological zones so as to optimize production of hydrocarbons from the well and thereby optimize the return on investment of time and money. The systems and methods described below can be used to provide such benefits, including automatically updating one or more well plans based on information obtained during drilling of a well and/or automatically adjusting one or more drilling parameters or operations during drilling of a well based on information obtained during drilling of a well to optimize the expected production of hydrocarbons and thereby the return on investment.

In a further aspect, methods and systems for iterative well planning for optimized results are disclosed. The disclosed methods and systems for iterative well planning for optimized results may provide various advantages and features. The disclosed methods and systems for iterative well planning for optimized results may define the geology as 3D cells of production probabilities, such that a high production probability may occur in the payzone, while a lower production probability may occur in gas cut or water cut risk zones and may be zero outside the payzone.

The disclosed methods and systems for iterative well planning for optimized results may define an expected drainage success based on a distance from the well and may combine the drainage success with the production amount likely from each cell to produce a Production Probability Percentages (PPP) for each well. A cell with a well nearby may have just the remaining PPP available after production has drained the nearby well. So, for two wells in close proximity to each other, the nearby well may have a greatly reduced PPP available. The consideration of PPP for adjacent or nearby wells may be used to improve well placement.

The disclosed methods and systems for iterative well planning for optimized results may calculate and display PPP and Time to Target (TTT) during a planning phase, and also during drilling without delay to inform decisions by drilling personnel, such as, but not limited to, a decision on when to trip to the surface. The inputs to TTT may include:
  Predicted torque and drag with estimated tortuosity from a reference well superimposed on the planned trajectory.
  Predicted optimal drilling parameters using an ROP model.
  Predicted slide/rotate sections to stay on plan including recovery curves.
  Accurately assessed slide and rotate curvatures (see Equation 19).
  Predicted bit wear effects on ROP and anticipated trip time, when indicated.
  Predicted likelihood of NPT failures based on extrapolated tortuosity.

Starting with the assumption of a single BHA for the entire well, the disclosed methods and systems for iterative well planning for optimized results may find a design that minimizes tortuosity and assesses TTT for a planned well. Then, TTT may be reassessed assuming one trip for a bit change allowing a new more optimal BHA to be run for the second hole section. Further trips may be added until optimal TTT is achieved with expected drillable parameters.

The disclosed methods and systems for iterative well planning for optimized results may perform an automated adjustment of slot/target allocation, kick off depths, kick off rates, kick off directions, among various factors, to minimize collision risk (e.g., the risk that the well borehole will collide with an existing well borehole) in the initial plan.

The disclosed methods and systems for iterative well planning for optimized results may provide an algorithm to determine a direction to drill for maximum spacing between adjacent well trajectories. The algorithm to determine a direction to drill for maximum spacing may be used for iterative site planning after each well is drilled and certain adjustments for slot/target allocation and kick-off are made.

The disclosed methods and systems for iterative well planning for optimized results may provide a BHA stability index (see Equation 6) to determine the stability of BHA performance to allow like for like assessment of the sensitivity of any BHA design and select a BHA design that is expected to perform most consistently.

The disclosed methods and systems for iterative well planning for optimized results may enable an automated redesign of remaining wells on a pad to achieve maximum PPP and minimum TTT while remaining within the original lease boundaries. New azimuths and drain spacing may also be generated as a result of the redesign.

The disclosed methods and systems for iterative well planning for optimized results may use measured geological parameters including the true geometry encountered to optimize the design of the subsequent wells. The use of the measured geological parameters may include:
  Way points in the reservoir by step out, depth and thickness.
  Pressure, temperature, porosity, hardness and friction factors. Pressure can inform casing design and hole section choices. Temperature can inform depth correction for accurate placement. Hardness and friction factors can inform ROP predictions. Porosity can inform production predictions.

The disclosed methods and systems for iterative well planning for optimized results may start with a tortuous well trajectory that results in a high PPP for the observed complex geometry of the reservoir encountered in the previous well. Then, the well trajectory may be incrementally smoothed to achieve a desired balance of PPP and TTT, such as based on torque and drag, NPT risk, and bit wear.

In some embodiments, a 'balance' between TTT and PPP may be generated as a numeric or quantitative factor for an evaluation, such as: well cost=TTT×(rig rate); and production gain=(overall PPP)×(asset value). For example, when an increase in well cost is less than about 10% of an increase in production gain, a change or alteration of drilling parameters, drilling equipment, the well trajectory, or various combinations thereof, may appear more justified. It is noted that the 10% increase in production gain is a non-limiting example, and that lower or higher values may be used in different embodiments.

Among other factors, success factors for a well being drilled, such as borehole 106, may include safety, cost and production capacity. Typically, a well plan is initially produced to satisfy basic criteria that are based on certain assumptions, such as any one or more of the following assumptions:
  A kick off depth for the well may be chosen based on an assumed depth at which curvature can be achieved in a stable geological formation.
  A kick off direction for the well may be chosen based on an assumed safest direction to avoid collision with other wells.
  Nudge rates may be chosen based on an assumed torque and drag capacity of the drilling rig and any indication to create safe space under the pad.

Build rates may be chosen based on an assumed hardness of the geological formation and the formation's ability to withstand grooving and the curvature capability of the drilling equipment.

Hold sections may be chosen by hole cleaning considerations, final completion types such as electric submersible pump placement and any contingencies resulting from insufficient curvature when sliding v Final build rates may be chosen based on an assumed balance between a so-called 'production shadow' (e.g., after the lateral kick off depth, as the build curve approaches the target reservoir depth) and the torque and drag generated by the curved well trajectory.

Lateral section lengths may be chosen by lease line boundaries, assumed maximum pressure for successful circulation, and the ability to deliver WOB.

However, the initial assumptions used at the start may be inaccurate and may lead to undesirable reductions in the operational efficiency of drilling the well.

The methods and systems for iterative well planning for optimized results disclosed herein may utilize certain technological improvements to provide an iterative method to generating a well plan for the well. For example, new algorithms have become available for numerically modelling the performance and behavior of BHA 149, as well as the performance and behavior of drill string 146. The algorithms may provide models based on the use of finite element analysis (FEA) models to determine a deflected shape of drill string 146 under the influences of weight, the flotation effect of the drilling fluid, WOB and any bend in the assembly that is constrained within the wellbore. From the FEA model results, the side forces at drill bit 148, and thus, the curvature of the wellbore, can be accurately predicted. Additionally, the ubiquity of cloud computing and high-speed networking has improved the ability to collect and process large amounts of data (e.g., "big data") without delay, and has enabled more detailed and specific decisions to be made by personnel in the field, such as on drilling rig 210 that is drilling the well.

The methods and systems for iterative well planning for optimized results disclosed herein may incorporate various parameters that affect the Time to Target (TTT) and the Production Percentage Probability (PPP). The TTT and PPP parameters, along with actual measured data, may be used for the iterative well planning for optimized results disclosed herein. Due to the complex nature of the inputs and the modelling, including the estimation of the TTT and PPP parameters, certain individual decisions involved with attaining an optimal well plan that leads to an optimally drilled well may not be intuitive to a human operator, particularly during drilling of the well. Thus, the methods and systems for iterative well planning for optimized results disclosed herein may provide a user interface to inform the decisions of a human operator performing drilling of the well on drilling rig 210. The methods and systems for iterative well planning for optimized results disclosed herein may also enable an automated drilling system, such as steering control system 168, to optimally drill the well according to the well plan in an autonomous or semi-autonomous manner.

The methods and systems for iterative well planning for optimized results disclosed herein may be based on a well model that is capable of predicting TTT in order to minimize drilling time and, thus, to maximize production. For example, a perfectly drilled well aimed at the optimum production region in the reservoir with perfect drainage spacing from the well around could be considered an ideal goal, but such an idealized well may be expected to be very slow and expensive to drill. A slightly less than perfect well may therefore provide a more desirable overall economic result. Furthermore, the impact on production may also be considered during well planning.

In conventional well planning, any impact on production may often be ignored in view of the primary objective that appears sensible to the driller: to drill the well as cheaply as possible usually by drilling the well as quickly as possible. However, applying the fastest or the cheapest drilling operations for drilling the well may not be in the best interest of the well owner. For example, if drilling the well would have taken one extra day, but with the result that production from the well could have been extended over the life of the well (e.g., a useful production life of the well), such a consideration may lead to somewhat different choices for drilling that might not be apparent to personnel on the drilling rig.

In the methods and systems for iterative well planning for optimized results disclosed herein, the FEA models may rely on various information available such as friction factors, wellbore pressures, fluid types, BHA design, bit type, bit wear models, penetration rate models, rig trip times, survey information, expected production contours based on the reservoir model, and geological formation characteristics, among others, in order to predict an expected TTT, along with PPP. Thus, such modeling and prediction of drilling results, as disclosed herein, may demonstrate the economic advantages of allowing a greater investment for drilling (in terms of time and cost, and a slower TTT), in order to reap greater rewards with a higher PPP later in the production lifecycle of the well. For example, the investment in the well may be given by (rig time rate)*TTT, while the return on investment may be given by (recoverable asset value)*PPP. By considering the return on investment in the well during planning and drilling, in addition to the actual investment in the well, well planning and drilling decisions may be made with more complete information than by solely considering TTT during drilling, and may result in an optimum balance between TTT and PPP, in order to maximize return on investment. For some low value wells, optimization based solely on TTT may provide an economically feasible solution. However, for higher value wells with larger potential paying target zones at stake, consideration of PPP may provide greater financial benefits than the savings from a fast TTT.

In the methods and systems for iterative well planning for optimized results disclosed herein, a computer implementation may receive the following information as input:

An initial well trajectory design.

Anticipated geological formations and their characteristics, such as locations, pressures, hardness, temperature and friction factors, pore pressures, fracture gradients, etc. Other formation characteristics may include a shape or an orientation, changes in dip, fault boundaries, and thicknesses.

A BHA design and expected performance of the BHA design for each section of the wellbore. The BHA design may be an optimized BHA design that may be usable for drilling the entire well, as described above.

Drill bit selections for each section of the wellbore.

Production distribution in the payzone.

Then during drilling, the following information may be measured by downhole sensors:

Actual pressure and temperature.

Actual location, shape, and 3-D geometry of the payzone formation.

WOB.

Downhole friction factors.

Vibration and shock.

Survey information along with current depth.

In some implementations, survey information and current depth may be measured by dual sensor logging with a known distance between the sensors and matching formation response to determine how far drill bit 148 has actually travelled. In particular embodiments, the dual sensors may be about 20 feet apart along the BHA. As both sensors travel through the same formation, the signals from each of the sensors can be correlated with one another to calibrate actual measured depth and determine an actual distance that drill bit 148 has travelled. From the measured values, ROP can be measured and maximized as a formation-dependent function of WOB, fluid flow rate, and rotary drilling speed.

In the methods and systems for iterative well planning for optimized results disclosed herein, the output may be steering and drillstring control information to follow a planned well trajectory with the highest PPP and lowest TTT. Accordingly, the methods and systems for iterative well planning for optimized results disclosed herein may enable optimized drilling of the well, which may not be optimized drilling to achieve a fast delivery, but may be optimized drilling to achieve the highest overall return on investment.

Figure 11:
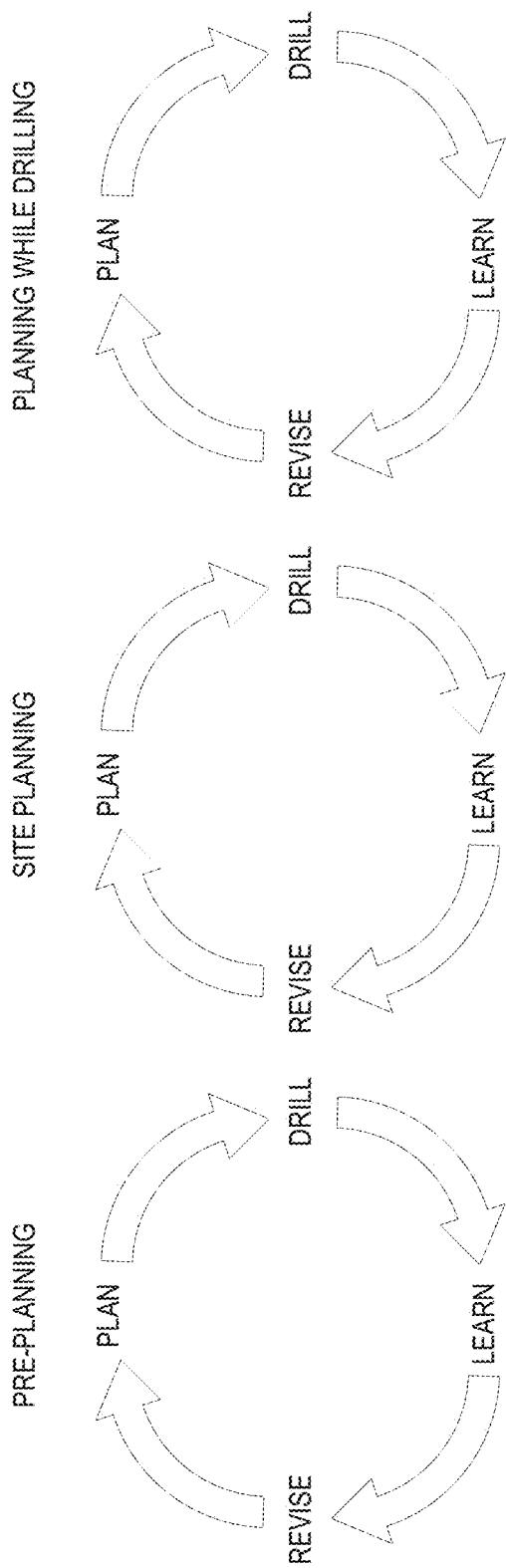
FIG. 11 depicts various iterative operations that can be performed in different phases of well planning.

Accordingly, the methods and systems for iterative well planning for optimized results disclosed herein may provide three phases for optimizing the well plan: a pre-planning phase, a site planning phase, and a planning while drilling phase. FIG. 11 depicts various iterative operations that can be performed in each respective phase, including operations to plan, to drill, to learn, and to revise the well plan, any or all of which may be performed automatically. Furthermore, each previous phase may inform the decisions reached during iterations of a next or a subsequent phase. In the pre-planning phase of the well plan, judicious estimates may be applied in order to choose specific equipment and survey tools, as well as to set drilling parameters, such as WOB, mud flow rates, RPM, frequencies, to provide the greatest production volume with minimal TTT for the well. As drilling rig 210 becomes operational at a pad or in the field, the site planning phase may update the well models in the well plan based on actual measured data, so that drilling of the next well can be improved over past performance. Finally, during the planning while drilling phase, the models in the well plan may be updated with data without delay, as new measured data or other information becomes available, in order to guide drilling decisions for drilling the well.

Figure 12:
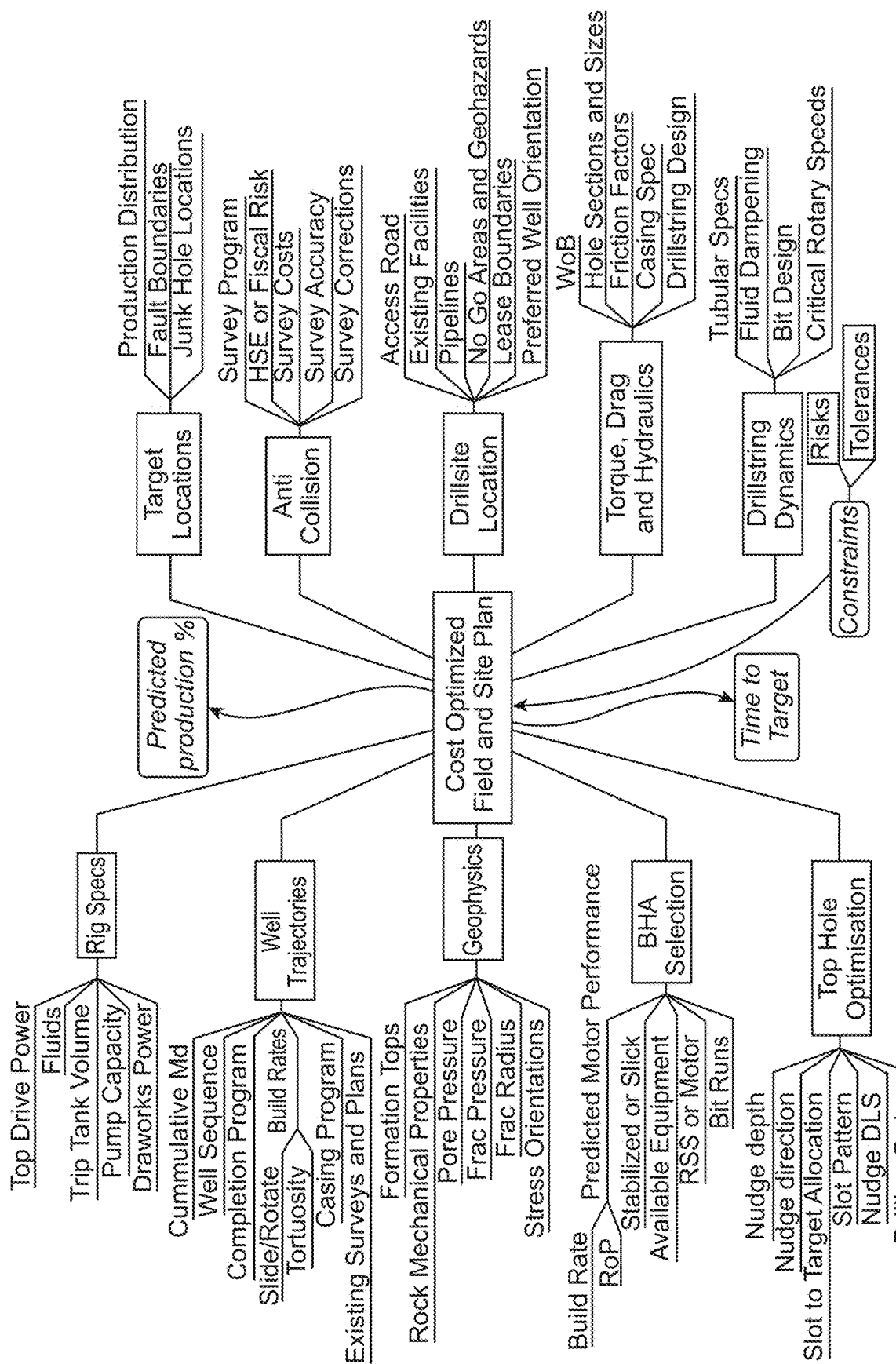
FIG. 12 depicts a block diagram showing considerations and factors that may be used.

FIG. 12 depicts various considerations and factors that may be used by the methods and systems for iterative well planning for optimized results disclosed herein. For example, the methods and systems for iterative well planning for optimized results disclosed herein may incorporate the following elements into the well plan:

A well trajectory in 3-dimensions (3D) that takes into account a most recently updated location an geometry of the payzone formation;

A specification of different well zones along the well trajectory;

An anticipated casing program along the well trajectory;

An anticipated survey program along the well trajectory, along with anticipated friction factors and wellbore temperatures to ensure accurate pipe length corrections for temperature and mechanical stretch;

A specification of BHA 149 for each well zone, or a specification of BHA 149 for the entire well, which may be economically more advantageous;

A specification of drill bit 148 for each well zone, or a specification of drill bit 148 for the entire well, along with an expected bit efficiency in percent versus measured depth of drilling;

A specification of drill string 146 for each well zone, or a specification of drill string 146 for the entire well, which may be economically more advantageous;

specification of the mud motor, including torque/pressure and rotary speeds to flow rates; and A specification of mud pump rates for each well zone.

The methods and systems for iterative well planning for optimized results disclosed herein may optimize the well plan using the following input information:

Formation boundaries and layers along the well trajectory;

Pore pressure and fracture gradients; and

A relationship between distance from the well and PPP.

Figure 13:
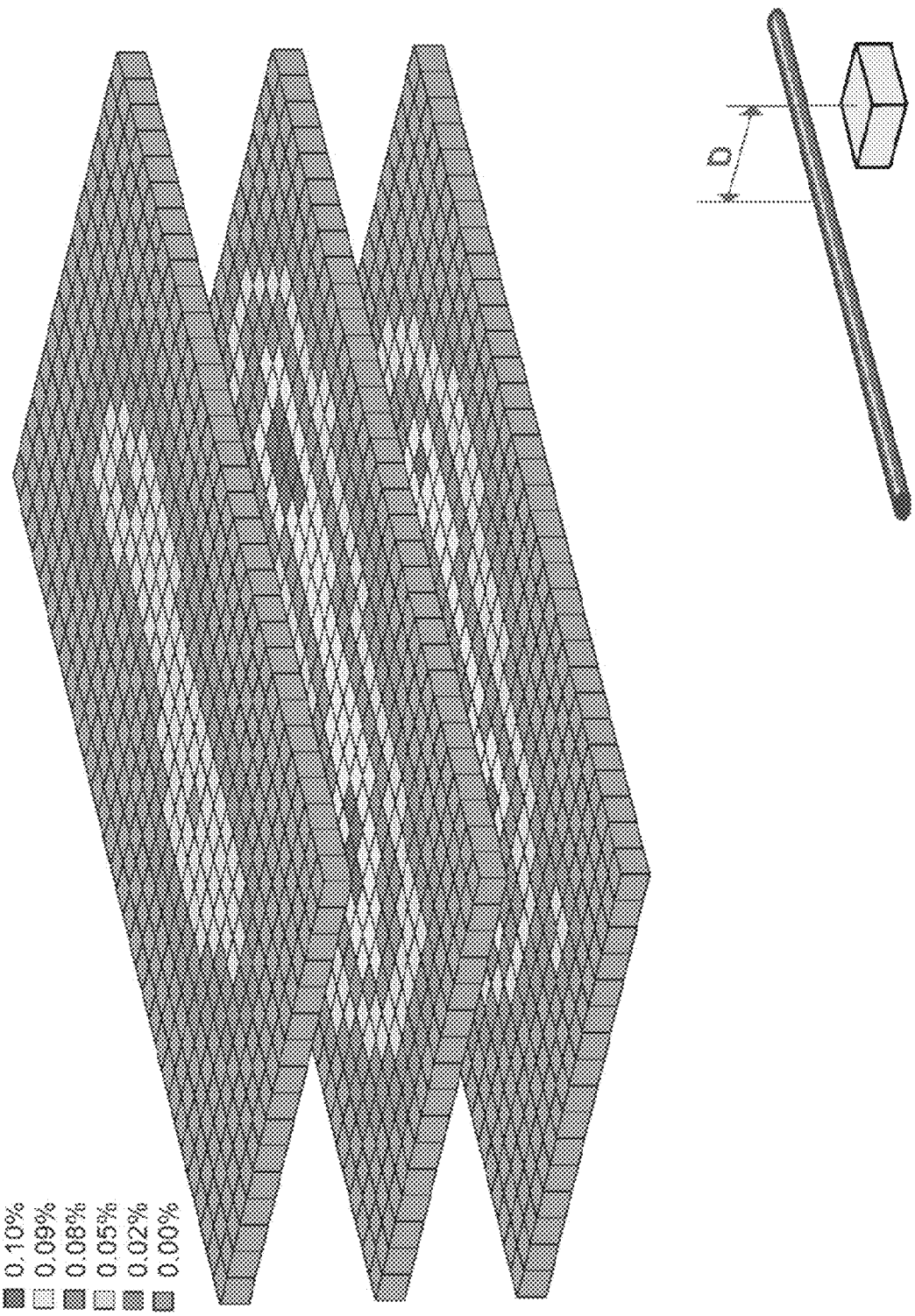
FIG. 13 depicts an exemplary pay zone that is divided into a plurality of individual finite cells.

FIG. 13 depicts an exemplary payzone that is divided into a plurality of individual finite 3D cells. The actual production achieved for a given well may be a sum of the multiples of the anticipated production efficiency identified in the reservoir by the reduction percentage related to distance from the well. As noted, PPP stands for Production Probability Percentage and represents an expected percentage of a reservoir asset that a well can recover. In various embodiments, the PPP value achieved for a given well may be calculated according to the following operations.

1. Divide the reservoir into 3D cells defined by location and volume. The cells may be uniform in shape or may vary according to some criteria.
2. Estimate a maximum recoverable volume per cell as a percentage of the entire reservoir recoverable volume.
3. Estimate a drainage factor F. For each cell, the production amount may be reduced with a distance D from the cell by the drainage factor F. A production contribution for each cell may be given by the expression: (maximum recoverable volume) (cell %) (F) (1/D2+1) within a defined maximum drainage distance.
4. For any trajectory through the reservoir, the well value may be given by a sum of all the contributions from each cell.
5. For wells drilled subsequently, the recoverable volume from each cell is reduced by the drainage from previously drilled wells.
6. When a well is off plan, a new PPP value may be automatically calculated and displayed.

For example, a cell in the reservoir model may be predicted at 90% production quality if penetrated directly by borehole 106. However, a drainage success for the cell may drop off by 1% of production volume for every 3 feet of distance from borehole 106, which indicates that the cell would produce at a PPP of 90*(1−(0.01*30/3))=81% if borehole 106 passed 30 feet from the cell. Furthermore, any cell in the target reservoir that is already being drained by another well at x % may have a starting value of (100−x) % available production for any new well that secondarily drains the same cell. Although the example depicted in FIG. 13 refers to a conventional reservoir with cells and drainage, the approach is equally applicable to shale reservoirs where a horizontal well trajectory would be drilled for continuous contact with optimized pay zones and would accordingly be used in determining PPP.

Figure 14:
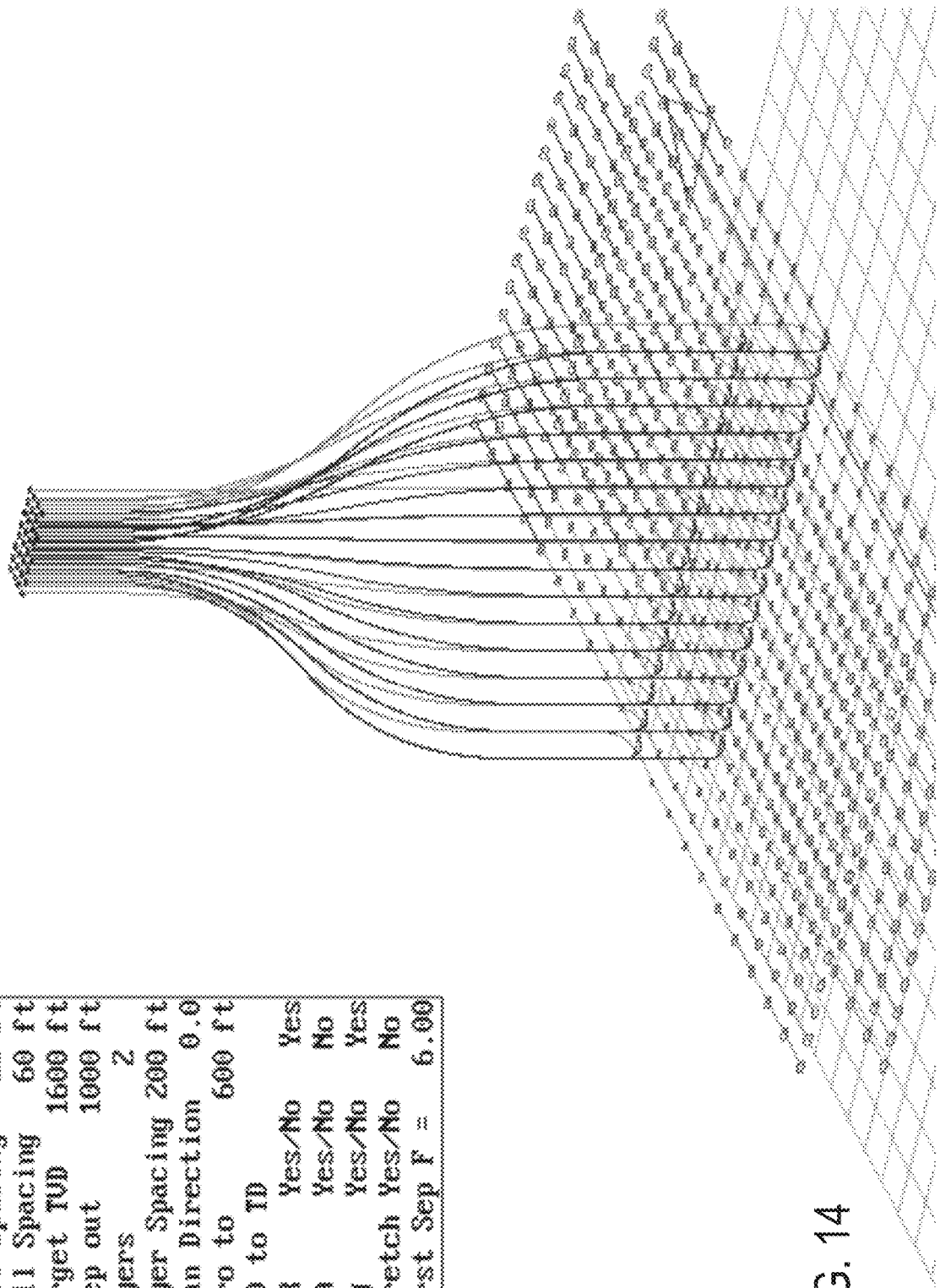
FIG. 14 depicts an image of a series of well trajectories from a pad generated in the pre-planning phase.

The methods and systems for iterative well planning for optimized results disclosed herein may enable the pre-planning phase with an objective to use as much available information as possible to specify the well (or a series of wells) in the well plan for maximal production, with minimal cost and minimal risk. The result of the pre-planning phase may be a definition of a relatively simple well trajectory, along with the specification of selected equipment, mud pump rates, and WOB windows for each well zone. In the pre-planning stage, assumptions for drilling the well may be based on a planned execution of the well plan during drilling, without substantial deviation the well plan. FIG. 14 depicts an image of a series of well trajectories from a pad generated in the pre-planning phase.

The methods and systems for iterative well planning for optimized results disclosed herein may enable the site planning phase with an objective to enable a well planner or other human operator to continuously improve the well plan based on actual measured data that was collected from one or more previously drilled wells.

Figure 15A:
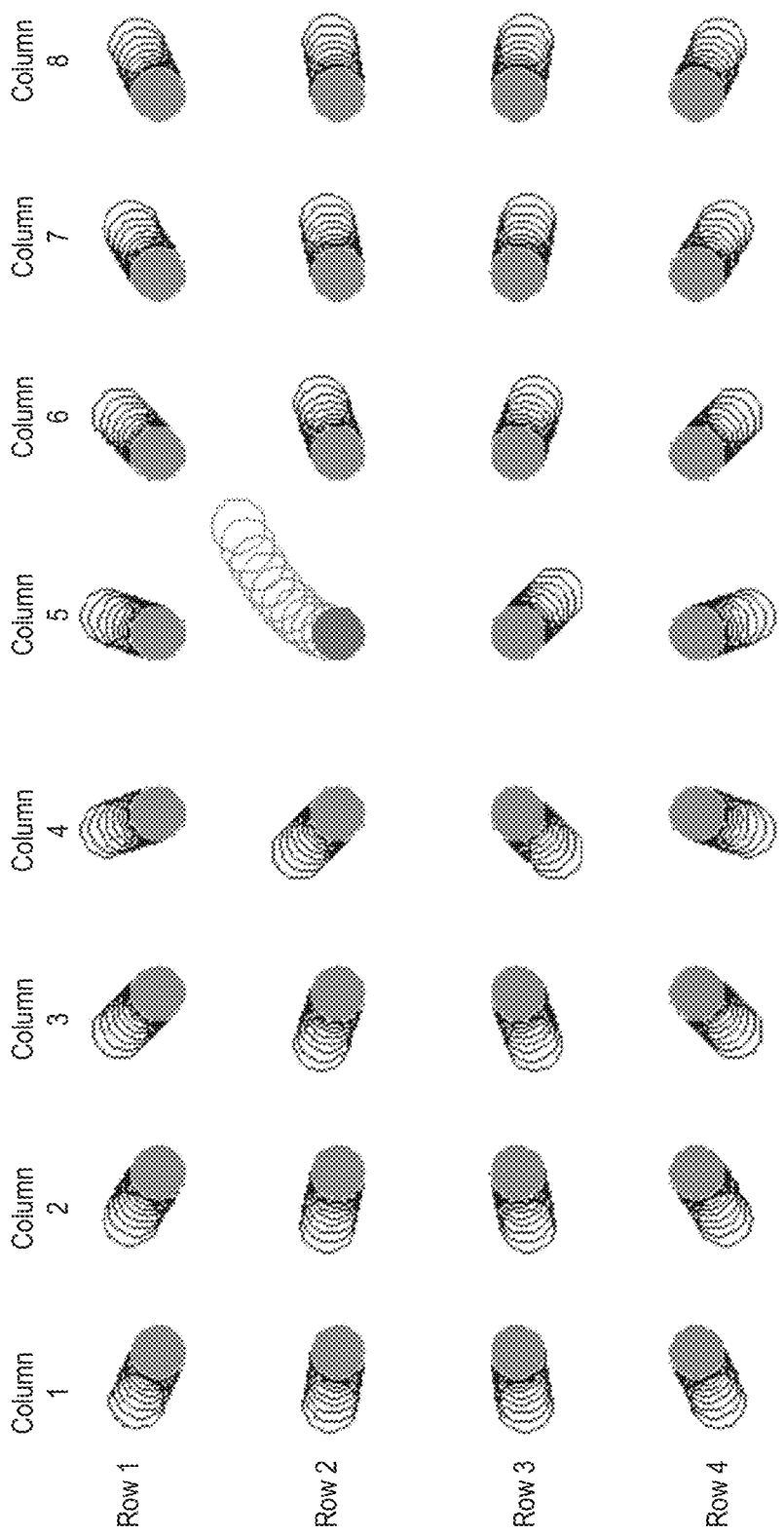
FIGS. 15A, 15B, and 15C show representations of various well trajectories for a series of co-located wells.

One optimization that can be performed in the site planning phase is the actual well trajectory. FIG. 15A shows a representation of various well trajectories for a series of co-located wells, such as from a single pad, in a 4 row, 8 column arrangement. The planned trajectories are shown for all the wells except for row 2, column 5, for which the actual drilled well trajectory was not exactly to plan. One method for optimizing the plan well trajectory in the site planning phase may perform the following operations:

Minimize a collision risk between all the well plans and the lease boundary and maximize the overall PPP by adjusting the spacing of the remaining wells;

Iterate the kick off depth over a window above and below the original kick off depth;

Iterate the kick off rate over a window above and below the original kick off rate;

Iterate the kick off direction within a window left and right of the original kick off direction;

Iterate drilling parameters for other well zones in the well plan before iterating the drilling parameters for the landing curve;

Minimize collision risk between the trajectory of the well being drilled and the trajectory of wells previously analyzed;

Rejoin the well trajectory to the planned or original intended landing curve; and Repeat the above operations for every row/column, slot-to-target combination to ensure that the planned or original intended row/column-to-target does not also need reviewed.

Once the slots fill up, the trajectories in top hole will become crowded and more random. The driller needs to find the space as best he can. An algorithm described below may help determine the azimuth toolface for safest drilling at each depth. In the TC plot shown in FIG. 15B, a current position 1510 is in the center and three wells (1512-1, 1512-2, 1512-3) are within a range to be a collision risk. If an angle to drill on was to be chosen, a sum of the squares of the distances to the surrounding wells 1512 from the current position 1510 can be maximized. For example, let the current position 1510 be defined as 0,0 and all other positions defined as relative to this origin. A displacement may be defined by dx and dy such that the displacement improves space between the current position and all the other wells. Thus, a space maximization equation may be given by:

$$S = \Sigma (X_n - dx)^2 + (Y_n - dy)^2 \qquad \text{Equation 1}$$

In Equation 1, X, Y are coordinates, n indicates a given well, and S is an overall aggregate displacement value to maximize. Then, given an azimuth angle a, let dx=sin(a) and dy=cos (a), which yields Equation 2 by substitution.

$$S = \Sigma X_n^2 - 2X_n \sin(a) + \sin(a)^2 + Y_n^2 - 2Y_n \cos(a) + \cos(a)^2 \qquad \text{Equation 2}$$

In Equation 2, $\sin(a)^2 + \cos(a)^2 = 1$, while $\Sigma X_n^2 + Y_n^2$ is a constant. Thus, a maximum of S occurs when a quantity T given by Equation 3 is minimized.

$$T = \Sigma X_n \sin(a) + \rho Y_n \cos(a) \qquad \text{Equation 3}$$

In order to minimize T, a differential T' with respect to a is set to zero, as given in Equation 4.

$$T' = \Sigma X_n \cos(a) + \Sigma Y_n \sin(a) = 0 \qquad \text{Equation 4}$$

Equation 4 may be solved for a to yield Equation 5.

$$a = \arctan\left(\frac{\Sigma X_n}{\Sigma Y_n}\right) \qquad \text{Equation 5}$$

Figure 15B:
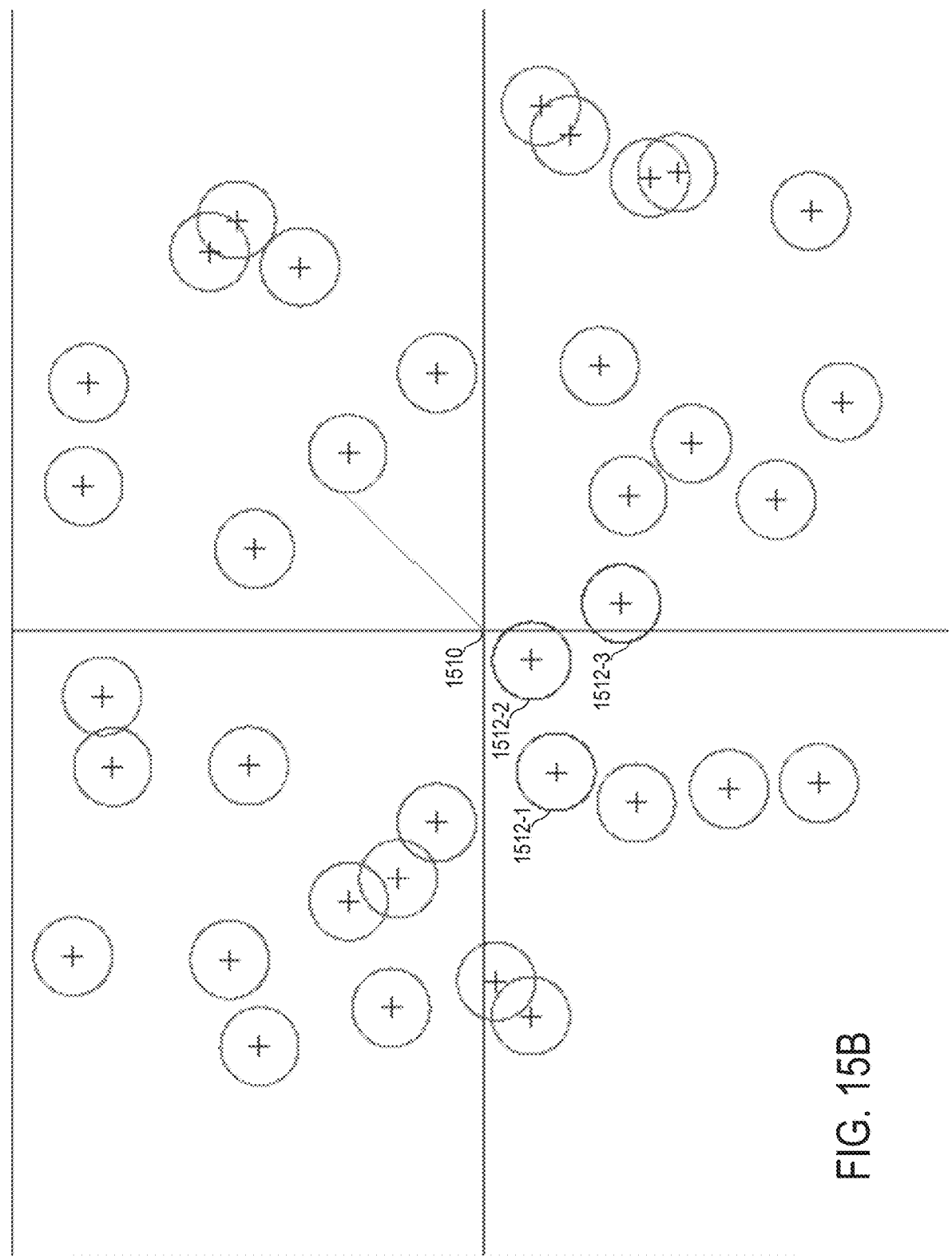

In practice, wells further away from the current location may not be as relevant as wells in proximity to the current location for iterative well planning, as disclosed herein. Accordingly, a filter can be used to remove wells that have a separation factor greater than a selected threshold, and then a weighting factor can be applied to the summation. In this manner, wells that are further away from the selected threshold for the separation factor may be disregarded. In one example, a reciprocal of the distance cubed between adjacent wells may be used for simplicity. Another possibility is to use a separation factors between wells, which may be simply described as a distance between wells divided by a sum of the uncertainties of the positions of the wells. In FIG. 15B, an optimal azimuth is reassessed in a series of points as the depth changes and the driller can 'find the space'. The vector shown at the center of FIG. 15B may indicates an ideal toolface angle to drill on to maximize available subterranean space for the well.

Figure 15C:
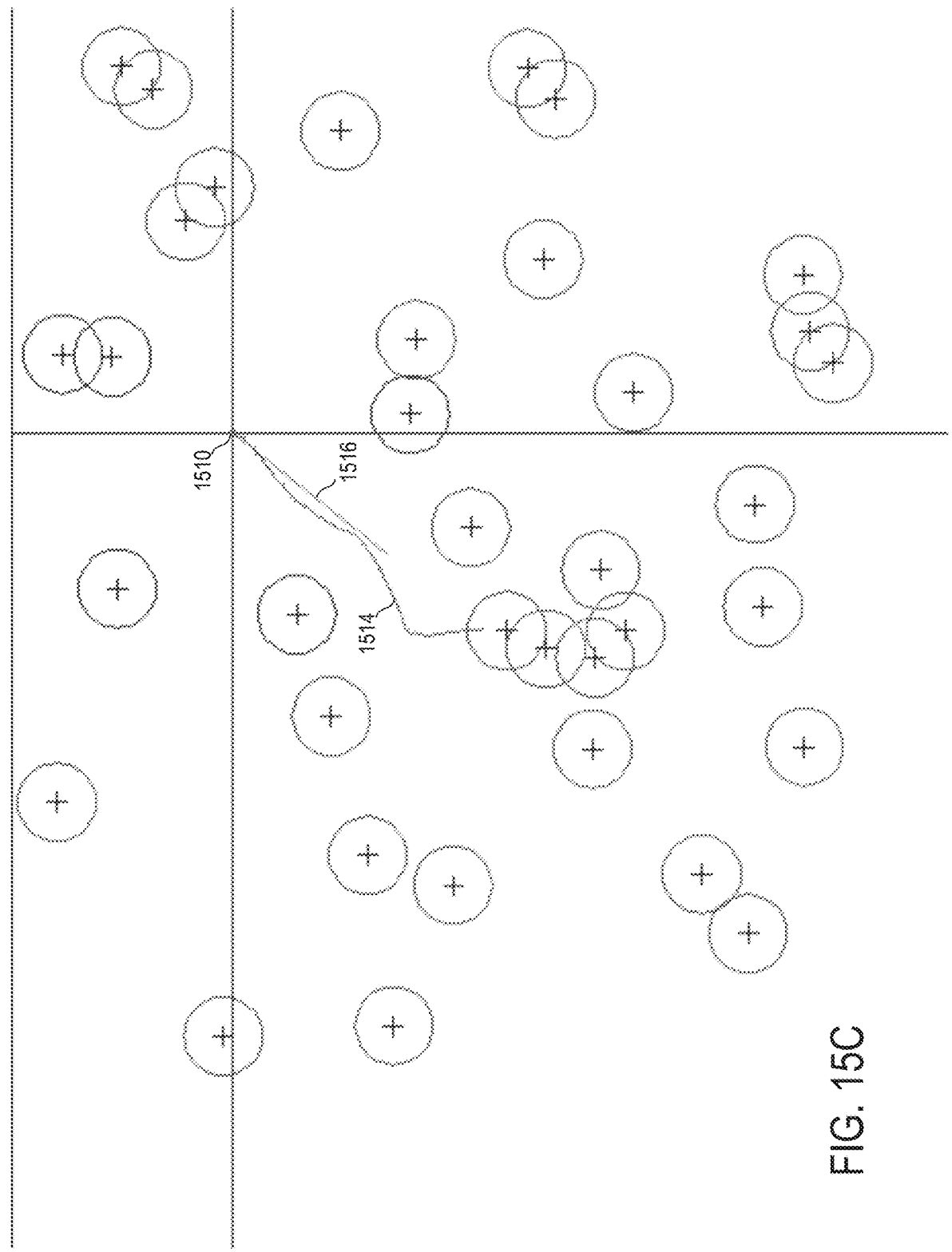

In FIG. 15C, the current position 1510 is still referenced, while a black trajectory 1514 indicates a recommended route at several depths to find space by assessing the best azimuth at each depth slice. In this case the algorithm above found a well trajectory 1516 between two adjacent wells into a larger gap beyond. However, if the algorithm determines a reduction in the sum of the distances, the algorithm may stop at the safest maximum. The sum of the distances may be defined as a total of the distances from the present well to other wells in proximity.

Figure 16:
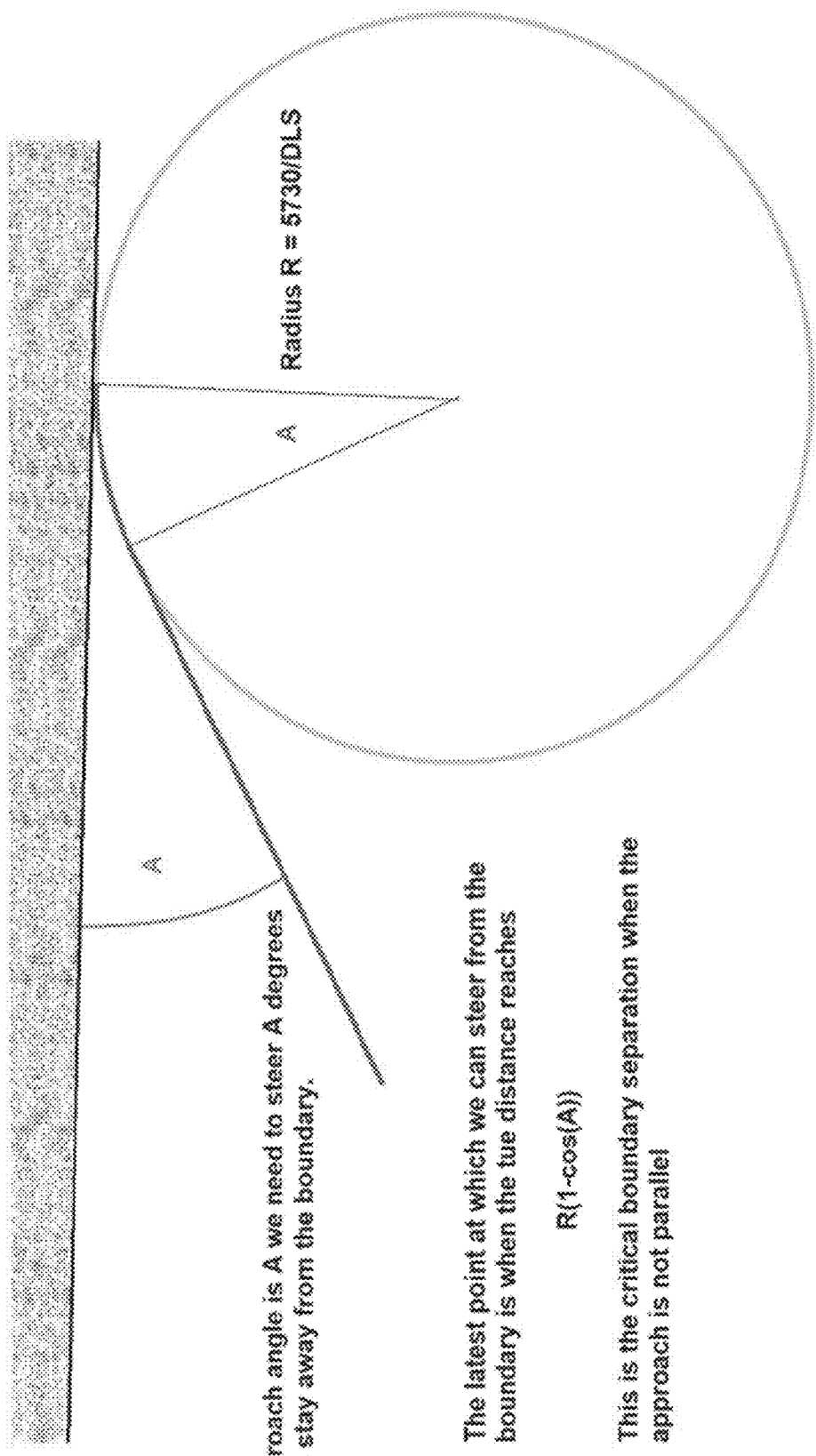
FIG. 16 describes a drilling methodology for making steering decisions with respect to a formation boundary that should be avoided.

Another optimization that can be performed in the site planning phase is the actual location of each formation top. For example, the expected TVDs of each critical formation may be modified based on actual observed or measured TVD for formations indicative of the well location. The formation top determination can be combined with measured gradients of approach to formations from geosteering and assessed past performance of BHA 149 to improve the guidance provided for steering decisions during drilling. Then, ongoing assessment of a dog leg severity (DLS) capability during drilling can further refine the formation top determination to avoid crossing formation boundaries that should be avoided. FIG. 16 describes a drilling methodology for making steering decisions with respect to a formation boundary that should be avoided.

Figure 17:
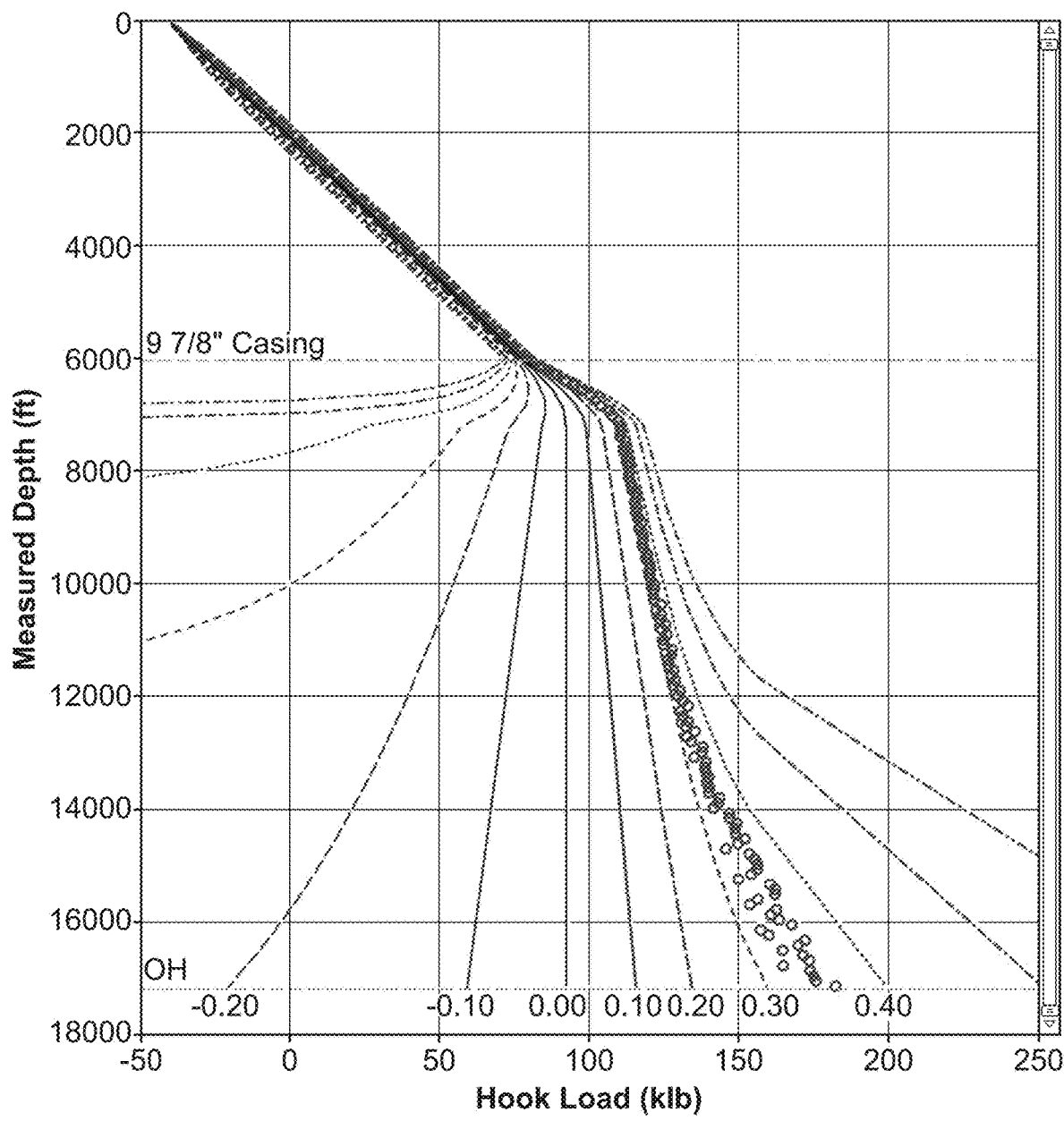
FIG. 17 shows plots of different hook loads versus measured depth.

A further optimization that can be performed in the site planning phase involves the physical properties of the rocks actually observed during drilling. For example, the formation parameters in the well plan may be modified based on measured or observed hardness of the rock that was drilled through. The hardness may be obtained from rock cuttings in the drilling mud, in one example. The hardness may be used to refine the relationships between ROP, WOB, and RPM. For example, friction factors for torque and drag in drill string 146 may be modified based on observed hook loads that were measured during a previous trip to surface 104. FIG. 17 shows plots of different hook loads versus measured depth for different friction factors. When the actual hook loads observed when plotted against trip depth appear to follow a particular line, the particular line may indicate a closest actual friction factor in the well and may allow the friction estimate to be improved when drilling a subsequent well in that same formation.

Still another optimization that can be performed in the site planning phase involves the actual performance of BHA 149. Initially during the pre-planning phase, BHA 149 may be chosen with a relatively small bend angle to ensure that slide drilling in a curve progresses smoothly without complications, in order to not fall behind the planned TTT. An adjustment of the bend angle of BHA 149 to achieve a calibrated 90% slide ratio may be subsequently used to minimize tortuosity of the actual well trajectory. It has been observed that a smoothly curved well trajectory that is slower to drill than alternating well zones of slide/rotation may actually improve actual TTT by reducing friction in the smoothly curved well zone, which may offset any reduction in ROP in a lateral well zone. Because torque models and drag models for drill string 146 may involve some superimposition of synthetic tortuosity, the second and subsequent iterations in the iterative well planning phase may incorporate measured tortuosity from previously drilled boreholes 106. Additionally, information describing other hazards during drilling, such as lost circulation, deflections, and sudden changes in hardness or friction or pressure, may be recorded and may be used to implement decisions under computer control or to indicate suggested decisions to a user. As drill bit 148 approaches a known formation change, which was known to have caused surprises in a previously drilled well, the methods and systems disclosed herein may be enabled to use information from the previously drilled well to anticipate drilling issues associated with the formation change, and to direct the predicted trajectory accordingly. For example, if a known soft rock formation, such as a formation having higher rock ductility, causes BHA 149 to drop rapidly for about 200 feet of TVD, the formation top can be approached with a build rate for which the anticipated drop is a recovery, rather than having to subsequently recover from the anticipated drop.

During the site planning phase, in order to analyze the performance of BHA 149, a BHA stability index may determine or may indicate a relative stability of BHA 149 (e.g., may indicate how easy BHA 149 is to control) that is given by the following equation, in which dTface is a tool face variation in degrees, dDLS is a DLS variation, dMD is an MD variation, and the integrals are cumulated over a depth range from md1 to md2.

$$BHA \text{ Stability Index} = \int_{md1}^{md2} \frac{dDLS}{dMD} \times \int_{md1}^{md2} \frac{dTface}{dMD} \qquad \text{Equation 6}$$

In Equation 6, a cumulated toolface variation in degrees dTface may be multiplied by a cumulated dogleg severity variation dDLS and divided by a measured depth interval (BID when sliding to result in the BHA stability index. The BHA stability index may be used to avoid sliding in formations and well zones in which the BHA stability index exceeds a predetermined threshold value. Additionally, information describing other hazards during drilling such as lost circulation, deflections, and sudden changes in hardness or friction or pressure, may be recorded and may be used for automated decisions.

In a further optimization, an accurate assessment of the performance of BHA 149 may be obtained from continuous monitoring. By smoothing and tracking an inclination angle I, an azimuth angle A, and a toolface angle $T_f$ recorded downhole, such as by MWD, it may be possible to assess a more realistic motor yield using certain approximations. For example, let $D_s$ define a dogleg severity when sliding, let $B_r$ define a build rate when rotating, let $W_r$ define a walk rate when rotating, and let $I_0$ and $A_0$ respectively define an initial inclination angle and an initial azimuth angle (i.e., initial attitude) for a section of the well trajectory under analysis. For sliding, the calculation of I and A may be given by Equations 7 and 8 respectively.

$$I = I_0 + D_s \cos(T_f) dMD \qquad \text{Equation 7}$$

$$A = A_0 + D_s \frac{\sin(T_f)}{\sin(I)} dMD \qquad \text{Equation 8}$$

For rotating, the calculation of I and A may be given by Equations 9 and 10 respectively.

$$I = I_0 + B_r \sin(I) dMD \qquad \text{Equation 9}$$

$$A = A_0 + W_r dMD \qquad \text{Equation 10}$$

Figure 18A:
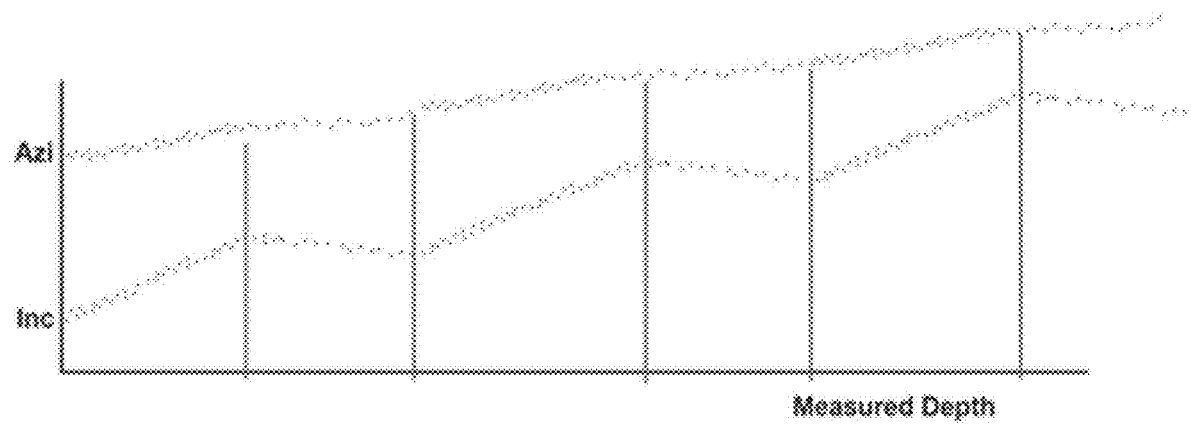
FIG. 18A shows inclination angle values and azimuth angle values for different alternating rotation well zones and slide well zones versus measured depth.

The assumptions underlying Equations 7-10 may include at least the following assumptions: a) dogleg severity $D_s$ when sliding is constant; b) sliding build rate $B_r$ slows with inclination; c) rotation may not necessarily by straight; d) walk rate $W_r$ is horizontal; and e) rotational build rate $B_r$ is proportional to sin(I). FIG. 18A shows how values of A and I can vary for different alternating rotation and slide sections versus measured depth.

As noted, Equations 7 and 8 give values for A and I when sliding. Rotate sections may be identified by a randomized nature of signals received from cross-axial accelerometers. Within a slide section, a least-squares value for $D_s$ may be obtained by minimizing a value for Equation 11.

$$LS = \Sigma(I_M - I)^2 + \Sigma(A_M - A)^2 \qquad \text{Equation 11}$$

In Equation 11, $I_M$ is a measured inclination angle and $A_M$ is a measured azimuth angle. In order to minimize LS as given in Equation 11, let $D = D_s$ (representing dog leg severity during sliding), let $c = \cos(T_f) dMD$, and let $s = \sin(T_f) dMD$, which can be substituted into Equation 11 to yield Equation 12.

$$LS = \Sigma(I_M - (I_o + cD))^2 + \Sigma(A_M - (A_o + sD))^2 \qquad \text{Equation 12}$$

Further simplifying Equation 12 yields Equation 13.

$$LS = \Sigma[(I_M - I_o)^2 - 2(I_M - I_o)cD + c^2 D^2 + (A_M - A_o)^2 - 2(A_M - A_o)sD + s^2 D^2] \qquad \text{Equation 13}$$

From Equation 13, the terms depending on D are written in polynomial form with respect to D, while terms not dependent on D are removed as constant with respect to D, to yield Equation 14.

$$LS(D)=\Sigma[-2(I_M-I_o)c-2(A_M-A_o)s]D+\Sigma[c^2+s^2]D^2 \qquad \text{Equation 14}$$

Then, Equation 14 can be differentiated and set to zero to find a minimum for D, as given in Equation 15.

$$LS'(D)=\Sigma[-2(I_M-I_o)c-2(A_M-A_o)s]+\Sigma 2[c^2+s^2]D=0 \qquad \text{Equation 15}$$

In Equation 16, a solution for minimum D by solving Equation 15 is given.

$$D_{min} = \frac{\sum[(I_M-I_O)c+(A_M-A_O)s]}{\sum[c^2+s^2]} \qquad \text{Equation 16}$$

Still further with respect to FIG. 18A, sections of the wellbore that have been drilled under rotation may be identified by a cyclic nature of signals received from cross-axial accelerometers. For the rotation sections of the wellbore, least-squares values for $B_r$ and $W_r$ may be identified such that the value LS for rotation, and specifically each of the two terms in Equation 11, given as $LS_I=\Sigma(I_M-I)^2$ and $LS_A=\Sigma(A_M-A)^2$, are individually minimized. For simplicity, let $B=B_r$ (build rate during rotation) and let $W=W_r$ (walk rate during rotation) and let s=sin(I)*d and let d=dMD. The first term $LS_I$ in Equation 11, related to the inclination angle, can then be rewritten, as given in Equation 17.

$$LS_I=\Sigma[(I_M-I_o)^2-2(I_M-I_o)sB+s^2B^2] \qquad \text{Equation 17}$$

Equation 17 will be minimized when the derivative $LS'_I$ has zero value. Thus, Equation 17 can be differentiated and set to zero to yield Equation 18.

$$LS'_I=2\Sigma[(I_M-I_o)s+2\Sigma s^2B]=0 \qquad \text{Equation 18}$$

Solving for B from Equation 18 yields Equation 19 for B.

$$B = \frac{\Sigma[(I_M-I_O)s]}{\Sigma s^2} \qquad \text{Equation 19}$$

The second term $LS_A$ in Equation 11, related to the azimuth angle, can then be rewritten, as given in Equation 20.

$$LS_A=\Sigma[(A_M-A_o)^2+2(A_M-A_o)*d*W+d^2W^2] \qquad \text{Equation 20}$$

Equation 20 will be minimized when the derivative $LS'_A$ has zero value. Thus, Equation 20 can be differentiated and set to zero to yield Equation 21.

$$LS'_A=2\Sigma[(A_M-A_o)d+2\Sigma d^2 W]=0 \qquad \text{Equation 21}$$

Solving for W from Equation 21 yields Equation 22 for W.

$$W = \frac{\Sigma[(A_M-A_O)d]}{\Sigma d^2} \qquad \text{Equation 22}$$

Using the assessments above, planning while drilling can use the observed trends in curvature that are measured to more accurately determine a slide depth and a rotating depth. With such greater accuracy of measured depth, recovery from the well may be improved to be better than an adjacent parallel well. In this manner, the well trajectory may be improved relative to the initial plan, while a likelihood of over correcting or under correcting, such as by a human operator, may be minimized. For example, when a directional driller (DD) is drilling off plan, the DD may plan a recovery trajectory assuming a constant dogleg of a fixed value. However, the DD may oversteer if the actual DLS delivered is higher than he expected. By knowing the actual DLS when sliding and when rotating, the wellbore trajectory can be optimally corrected without oversteering.

Yet another optimization that can be performed in the site planning phase involves evaluating rotary drilling versus slide drilling for different well zones in the well plan. For example, at least two cost considerations may be governing factors when specifying BHA 149 for use in a well plan:
- a difference in ROP when rotating as compared to sliding, where rotating typically results in higher ROP but with higher overall tortuosity of borehole 106 in the well trajectory than sliding; and
- uncertainties in the parameters for a BHA model that affect a motor yield, including factors such as stabilizer rotation versus rock hardness and mud temperature.

Figure 18B:
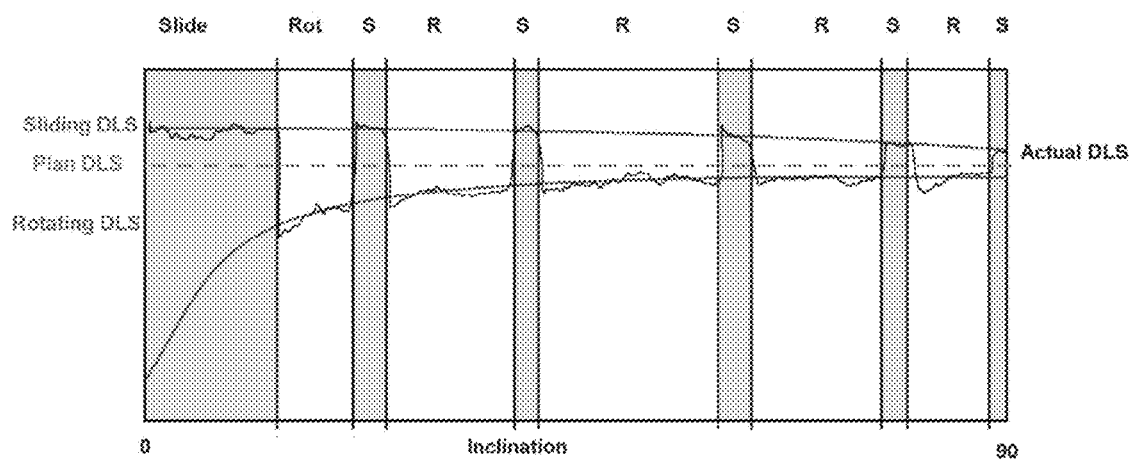
FIG. 18B shows actual DLS versus inclination from 0-90 degrees for different alternating rotation well zones and slide well zones, along with planned values.

In the site planning phase, the above cost considerations may be optimized by constraining DLS with a performance 'window' large enough to include the uncertainties in the parameters for the BHA model. BHAs based on so-called 'dumb iron' rotary designs to achieve a given DLS at a given inclination when rotating, but yet have a built-in bend angle to allow sliding, can be specified for both rotating and sliding. Such BHAs may be specified such that when rotating, an expected build rate is just below a desired DLS, and when sliding, the expected build rate is just above the desired DLS. In this manner, rotation may be predominately specified along the well trajectory, while sliding is limited to certain well zones in order to get the actual well trajectory back along the planned well trajectory, with very little change in the overall smoothness of the well trajectory. FIG. 18B shows actual DLS versus inclination from 0-90 degrees for different alternating rotation well zones and slide well zones, along with planned values. A further optimization may involve balancing a BHA curvature that is best suited to achieve the specified build section or sections, with the BHA curvature that is best enabled for minor corrections in the lateral section or sections. For example, an iterative analysis may be performed based on an expected curvature in the lateral section(s). and may involve evaluation of different BHA configurations in different iterations of the analysis. Each different BHA that is analyzed may be evaluated for the entire well and may be selected based on the least overall impact on total production over the life of the well. For example, various criteria such as a loss of production in the 'production shadow' (due to build rate, such as a 10° build rate), an expected time to target, and a consequent delay in production at the end of the well. In one example, with a 10° build rate, the production shadow may extend about 573 feet above the vertical.

Still further optimizations can be performed in the site planning phase. For example, the dynamic behavior or properties of drill string 146 may be optimized. For example, certain optimizations or remediation of drilling dysfunction may have been applied or observed during drilling of a previous well in a given location, such as certain RPM values, certain actions for drilling through high friction formations, among others. When a subsequent well with a similar well plan, such as another well in the same given location, the previously applied measures may be recorded and stored in a computer system and then used for optimization of subsequent well plans. For example, pressure and temperature measurements obtained during drilling of the previous well may be used as inputs to the hydraulics model for the subsequent well. Specifically, certain relationships between cutting size, ROP, WOB and RPM may be established and recorded upon drilling of the previous well, and may be used as input for the hydraulics model for the subsequent well. In particular, a wear rate for drill bit 148 may be used, along with actual formation information indicative of formation hardness being drilled through, to determine when a trip to surface 104 is indicated in order to replace drill bit 148, which may be a significant cost factor in drilling. In this manner, the trips to surface 104 may be optimized to prevent overly long delays between trips that can result in slower ROP before the trip and a longer trip time due to the increased length of drill string 146 for the trip.

The methods and systems for iterative well planning for optimized results disclosed herein may enable the planning while drilling phase with an objective to enable a driller or other human operator to continuously improve the well plan based on actual measured data that was collected from previous drilling of the same well. For example, the well plan may be updated with measured data or observations to determine more accurate actual values for TTT and PPP during drilling. Any changes in the planned drilling performance or the planned well trajectory may be directly used to update the well model and recovery well plans may be generated to get drilling operations back as close as possible to optimal or planned PPP and TTT values.

In developing a well plan, including a new well plan or an updated well plan such as for a well in which drilling has already begun, it may also be helpful to consider optimizing the overall tortuosity of the planned well path and/or optimizing the tortuosity in combination with the optimal TTT, PPP, equipment to be used, well path trajectory, and other drilling parameters. The use of data from one or more previously drilled wells, especially one or more previously drilled wells through formations that are expected to be drilled through in the well under consideration for the well plan and that may be close to the well to be drilled (e.g., using a previously drilled well on a pad when pad drilling a new well on the same pad), may be used to simulate the effects of various equipment and/or well tortuosity and to choose equipment and plan the well path with an optimized tortuosity.

In practice, experience suggests that the cost per foot of drilling the wellbore is highest towards the end of the wellbore. This is due in large part to the high friction build up from the extended length of the well bore and the drill string in this part of the wellbore. This greater friction, moreover, is increased by greater tortuosity of the wellbore. In turn, tortuosity is often increased by using an aggressive bottom hole assembly (BHA) selection such that the selected BHA will build an angle faster and thus drill through the curve section of a wellbore faster. While the build angle may be greater with such a BHA, and thus a particular curve might be drilled faster and therefore cheaper, it is believed that in fact the short term gain (e.g., in time, in costs, etc.) of drilling a curve more quickly are often canceled out by the later increase in drilling time and added costs due to the increased friction encountered later in the drilling of subsequent portions of the wellbore (especially the lateral portion towards the end of the wellbore).

Figure 18C:
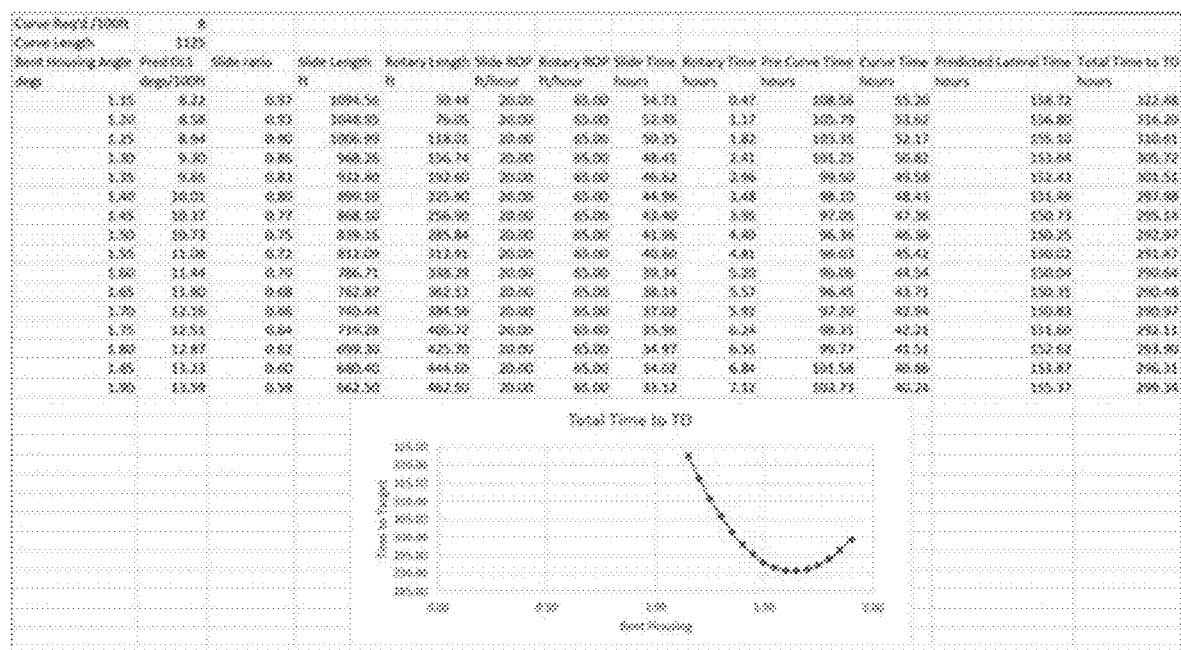
FIG. 18C is an example table of a model that predicts TTT responsive to a bent angle housing for a bottom hole assembly (BHA) and a plot of the TTT values versus the angles.

In one embodiment, a computer system can simulate the time required to drill a wellbore (e.g., TTT) based on a variety of factors. In one embodiment, data from one or more reference wells can be used for the simulation, and one or more variables (e.g. equipment variables, drilling variables such as ROP, WOB, etc., drill path trajectory, including the length of planned slide drilling and rotary drilling segments, etc.) can be changed to find an optimal combination of a BHA bend angle, dogleg severity, slide ratio, and the like. Referring now to FIG. 18C, a list of the values for a number of well variables for a planned wellbore or portion of a wellbore to be drilled is provided. A well plan can include a well path from which a number of variables can be determined, such as a predicted dogleg severity, a slide ratio, a slide length, and a rotary length. Data from one or more previously drilled reference wells can help determine values such as slide ROP, rotary ROP, an amount of time required for slide drilling, an amount of time required for rotary drilling, and a predicted pre-curve drilling time, a predicted curve drilling time, and predicted lateral drilling time for simulation. These drilling times can be added to provide a total time to target for a given sent of well data inputs.

In FIG. 18C, for example, it can be seen that a series of rows are provided, each corresponding to a data input for the bent housing angle for the BHA under consideration for drilling the wellbore or a portion of the wellbore. The angles are provided in the left-most column in FIG. 18C. Based on the assumed bent housing angle, the well plan, and the data from the one or more reference wells, the computer system can calculate a predicted TTT corresponding to each bent housing angle for the BHA, which is shown in the far right-hand column of FIG. 18C. It should be understood that the computer system can also simulate and predict TTT values for other variables, such as by considering a plurality of alternative well paths that may be drilled, each with the same BHA or a series of different BHAs, with a plurality of different angles of the bent housing of each BHA. In addition, for each bent angle value, the simulation can be run with different input data assumptions, such as the data for slide ROP, rotary ROP, dogleg severity, and so forth. As can be seen in the plot labeled "Total Time to TD" in the bottom of FIG. 18C, the TTT values from the simulation can be plotted against the BHA bent housing angle and it can be seen that the optimal bent housing angle for the BHA to optimize drilling of the wellbore is not the highest angle that drill the quickest and sharpest curve. In other words, a lower dogleg severity that helps lessen tortuosity for the curve section of the well pays off by reducing the overall time to drill the wellbore to target.

It should be noted that, although the foregoing discusses the use of such a model or simulation in the context of well planning, it can be used during drilling of a wellbore and can be used with data from one or more previously drilled portions of a wellbore being drilled. The foregoing can be used to alter or adjust a well plan, including the planned path or trajectory of a wellbore, and/or it can be used to select equipment to be used on subsequent portions of the wellbore (such as by switching to an alternative BHA), and/or it can be used to better determine appropriate ROP targets for one or more portions of the wellbore (e.g., slide, rotary, etc.), and/or predicted times to drill one or more portions of the wellbore (e.g., the lateral, a particular rotary section, a particular slide section, etc.).

Figure 19:
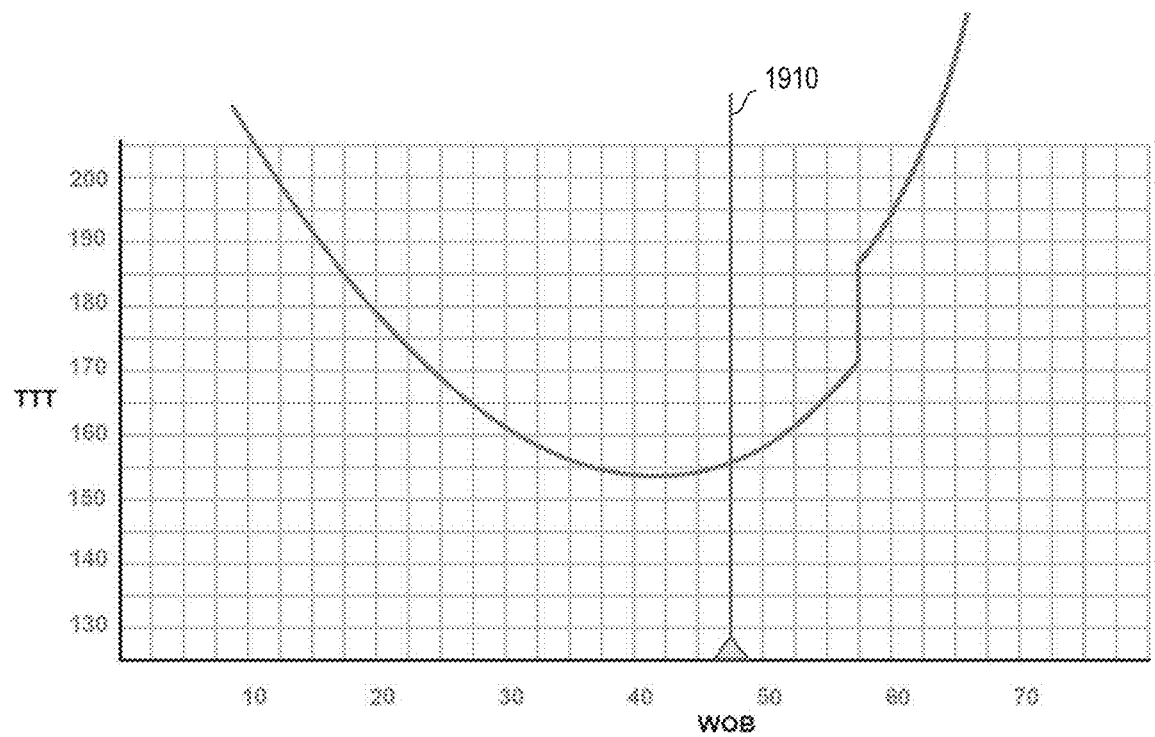
FIG. 19 depicts a plot of TTT versus WOB.

One optimization that can be performed in the planning while drilling phase is shown and described below with respect to FIG. 19, which depicts an example of a plot of TTT in hours versus WOB in lbs. In FIG. 19, a marker 1910 shows where drill bit 148 is in a lateral well zone and is drilling with 47,500 lbs (WOB, which is near a minimum TTT on the plot. However, a torque and drag model being used may be calculating that some sinusoidal buckling in drill string 146 is increasing wall contact, and consequently creating drag above 42,500 lbs (21,590 kg) WOB. In this case, it may be determined that ROP will be faster if WOB is reduced. Also the torque and drag model may predict that helical buckling will occur around 70,000 lbs (31,800 kg) WOB, but also that at 57,500 lbs (26,100 kg) WOB, bit wear will be increasing at a rate that a trip to surface 104 is indicated. The timing of the trip can be chosen by the torque and drag model to minimize tripping time and maximize ROP overall. In other words, the remainder of the drilling of the well may be optimized to minimize TTT based on observed drilling conditions for the same well. The torque and drag model may be used to predict conditions under which buckling will be observed, which can cause increased side forces, and thus, may wrongly indicate increased WOB to overcome the additional friction generated by the side forces. It is noted that the torque and drag model may be used by the methods and systems disclosed herein to anticipate the TTT in advance, and to decide when to reduce WOB during drilling to actually increase ROP.

Figure 20:
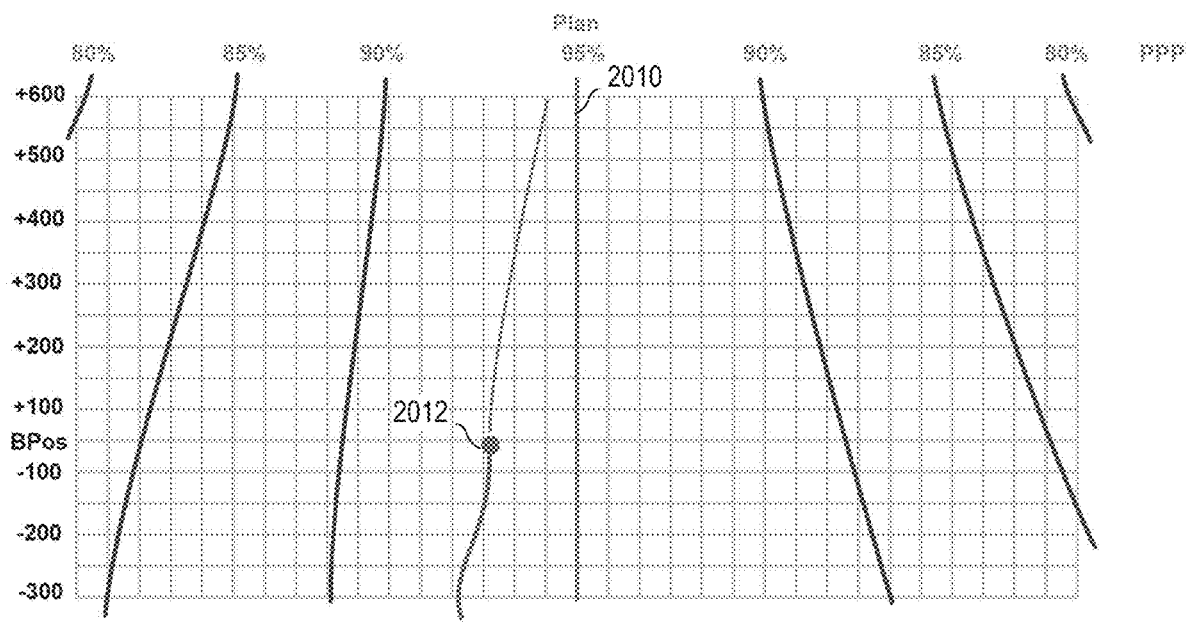
FIG. 20 depicts plots for different PPPs against bit position values.

Another optimization that can be performed in the planning while drilling phase is shown and described below with respect to FIG. 20, which depicts plots for different PPPs against bit position (BPos) values. In FIG. 20, the X axis represents an offset from a plan line 2010 shown in the center, at 95%, while the Y axis shows depth along the plan line, with a dot 2012 showing the bit position. FIG. 20 is directed to lateral drilling by drill bit 148 and a projection recommended by a balance of tortuosity and PPP improvement is shown by the purple line. In FIG. 20, plan line 2010 shows a 95% PPP as a baseline plan trajectory, and does not show 100% PPP, which is a theoretical value that may be attained only from a perfectly positioned well in a perfect reservoir. Actual PPP may be less than 100% and may be governed by a balance of survey time and cost against PPP at the start of drilling to minimize the effects of survey uncertainty on PPP. The result of the optimization may be used to determine how maximum value can be created from the well for minimum cost. For example, using the torque and drag model from the present bit position shown in FIG. 20, the fastest route to better production might be assessed as a sharp right turn to get back on the plan line. However, such a sharp turn would create high tortuosity, and thus, high torque and drag due to the friction of the sharp curvature. Accordingly, the methods and systems disclosed herein may select a curvature that produces a rapid recovery to towards improved production without slowing down the ROP due to increased tortuosity. In this manner, the value of the production is given greatest weight in the trajectory decision. When the recovery to plan can be achieved without failing to reach TD or generating unacceptable friction for future casing, the return on investment in the well may have been optimized in terms of PPP, rather than an investment in a fast TTT.

Figure 21:
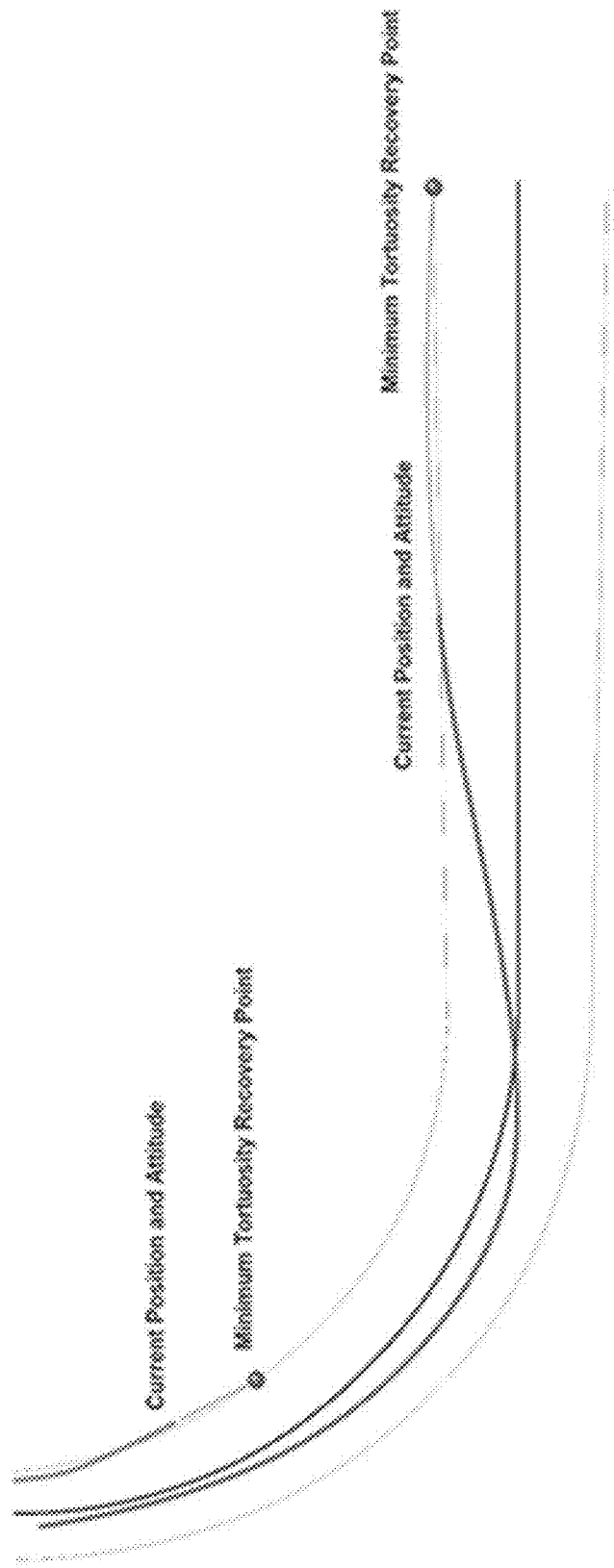
FIG. 21 depicts plots for optimal relative position of the wellbore trajectory for production.

Still further, well plans may be modified to achieve optimal relative position of the wellbore trajectory for production as shown with respect to FIG. 21. The following strategies may be followed to achieve optimal relative position of the wellbore trajectory.

In a first strategy, a window may be steered rather than a plan line. For example, an acceptable PPP window may be defined in the lateral as a high side dimension and a lateral dimension around the plan trajectory that varies with along hole depth. Then, from a well reference point, it may be assumed that the window grows linearly until the reservoir entry point, which may yield an upper trajectory and a lower trajectory and a left trajectory and a right trajectory defining an acceptable volume within which to drill for optimal production. If the uncertainty model influence on PPP is too high, leaving a very tight window, the survey program may be revised to improve the PPP and ensure that a drillable window remains. Next, an array of points can be created that describe the window as a volume at some resolution (e.g., 10 feet on MD and 2 feet on a lateral and a high side). Each point in the array may have a corresponding attitude parallel to the MD point in the plan. At each point during drilling, the algorithm defined above for geological boundaries may be used to steer within the window boundaries, aiming to minimize the approach angles. If the boundary is breached, the following procedure may be used: For each array point, use a current motor yield to determine a hold/curve correction to achieve recovery at that array point, then route the well trajectory parallel to the plan trajectory from there to TD. Choosing the trajectory with minimum accumulated slide will minimize the TTT. However, estimated cost of drilling and recoverable asset value may be provided and compared to each other, as given in Equations 7 and 8.

Cost of drilling=(TTT)*(a spread rate)     Equation 7

Recoverable Asset Value=(estimated asset value)* (PPP)     Equation 8

The first strategy may enable informed decisions when an increase in TTT is indicated in order to maximize recovery.

A second strategy to achieve optimal relative position of the wellbore trajectory may be to aim for a parallel well trajectory with a well plan trajectory, rather than for an exact alignment with the well plan trajectory. For example, if a previous well was drilled with a variation from an original azimuth angle in the well plan, it may provide no advantage to drill a subsequent well in the same location to the original azimuth angle (i.e., according to the original well plan). If the original azimuth angle is used nonetheless for the subsequent well in the same location, negative impacts such as a draining gap or overlap of the well trajectories between the previous well and the subsequent well may occur. Instead, by drilling the subsequent well along a variation from the original azimuth angle, and by using magnetic, acoustic or other ranging to achieve the parallel well trajectory between the wells, the separation between the previous well and the subsequent well may be optimized. In case the parallel well trajectory is in danger of breaching a lease line for the subsequent well, the well spacing may be optimized for the subsequent remaining wells to realize maximum PPP without crossing lease line boundaries.

A third strategy to achieve optimal relative position of the wellbore trajectory may be to ignore correlated errors when determining uncertainty for PPP success. The correlated errors, such as declination angle error or stretch, can be ignored when planning for maximum PPP. Similar to the second strategy above, if the azimuth angles of neighboring wells are in the same direction, any contribution from declination angle uncertainty may not affect a separation calculation for the wells, since the declination angle uncertainty may be common for neighboring wells. Different wells reaching a distance before turning to heading will have correlated depth errors and can be assumed to be biased in the same direction. In such cases, optimizing the PPP may involve parallelization rather than absolute position of the wellbore trajectory.

A fourth strategy to achieve optimal relative position of the wellbore trajectory may involve judicious selection of well directionality. Since magnetic interference is systematic but can have a positive or negative sign, the well plan may aim to drain as close to magnetic north or magnetic south as possible to minimize the effects of magnetic interference.

Iterative Well Planning

As disclosed herein, iterative well planning functions are used for implementing well drilling plans based upon historical well data. As wells are drilled, performance is tracked by the iterative well planning functions of steering control system 168 relative to formation, depth, time and other criteria. Based on variations of efficiency previously measured by steering control system 168, it may be possible to suggest a more ideal well trajectory to maximize operational performance. For example, a particular formation on a well path trajectory may provide a challenge to manage toolface direction or to accomplish desired build rates. An improved well trajectory can be matched to the potential of BHA 149 in combination with the formation or may avoid angular deviation in certain zones that have low slide efficiency. The iterative well planning functions of steering control system 168 may make the suggestions for the well drilling plan dynamically based upon historical data and may allow for better planning of future wells. The quality of the historical data relied upon may result in improving the value of a planned well in this manner.

As wells are drilled, performance is tracked by steering control system 168 relative to formation, depth, time and other criteria. Based on variations of efficiencies measured previously by steering control system 168, it may be possible to suggest an improved well trajectory to maximize operational performance of the well. As an example, a particular formation in a curve may be challenging to manage toolface direction or accomplish desired turn or build rates. An improved trajectory in the curve can be matched to the potential of the BHA in combination with the formation, and may assist in avoiding angular deviation in certain zones that have low slide efficiency. Furthermore, an automated implementation of the improved well trajectory determined by steering control system 168 may enable adjacent wells to be drilled in rapid sequence, whereas a corresponding manual analysis might consume so much time to perform so as to be economically not feasible in such a situation. Steering control system 168 can make these suggestions dynamically based on historical data and allow for better planning of future wells. The quality of the historical drilling data from adjacent wells is better and more accurate than the information typically available for human decision-making, which may also improve the value of the automated iterative well planning function.

It is noted that steering control system 168 may also enable a number of other processes such as seismic well planning, horizontal well placement with accuracy and maximum ranging.

Seismic Well Planning

When wells, such as but not limited to horizontal wells, are planned, the wells often start with a 2D or 3D seismic reference to establish the TVD targets for the lateral section. The contour of the subterranean formation layers may often angulate similar to rolling hills on the surface. It is common practice for ease of manual calculation and manual interpretation to use a small number of waypoints along the lateral length of the formation layer to traverse a target formation layer with a series of straight lines rather than match the formation angle and angulation. However, with this low resolution match of straight line segments trying to match a contoured formation layer, a large portion of the lateral plan may be either near formation boundaries and produce fewer hydrocarbons or go against the natural grain or bed dip of the target formation and lead to additional rotary build and walk magnitudes while drilling. Such inefficiencies may arise when trying to keep the well plan relatively simple in geometry for the rig crew and the geosteering teams.

Steering control system 168 can take high resolution profiles of formations sourced from seismic date to define an ideal contour for both drilling and production. As the cost curves are anchored to the well plan and can adjust based on a variety of rules and value-driven functions, a more complicated well plan trajectory may be easily processed and managed using digital processing. By relying on digital processing rather than manual interpretation, steering control system 168 can calculate with greater accuracy and follow far more geometrically complex shapes than a human performing manual calculation and manual interpretation. In this manner, steering control system 168 may enable implementing a seismic profile driven well plan. Since the ideal trajectory may be a tortuous trajectory, an analysis of torque and drag can be applied and can be incrementally 'smoothed' or refined. The smoothing or refinement of the torque and drag analysis can be enhanced to a greater degree by applying curve and hold sections using a least squares method based on actual measured BHA performance values from previous wells. The incremental smoothing or refinement may be repeated until a desired balance between TTT and PPP is achieved.

Horizontal Spacing and Accuracy

As more horizontal wells are drilled in a given reservoir and the spacing between those adjacent wells is reduced, it may be in many cases more important to maintain spacing to adjacent wells than to follow a particular well plan. The issues of adequate spacing between adjacent wells may be driven by fracking concerns involving communication between adjacent wells but also relates to maximizing contact with the producing reservoir rock. Adequate spacing between adjacent wells may be particularly important when a sequence of wells are drilled on a single pad or additional wells are inserted in an area that already has existing wells.

With steering control system 168, the convergence planner 1116 can prioritize or bias wells to maintain spacing even when an adjacent well does not have a straight trajectory. Similar to other cost based curves and system prioritization drivers, a cost curve focused on proximity to adjacent wells can be used to find the ideal placement based on the production impact of the wells becoming too close or far apart to be optimal. This is applicable in horizontally parallel wells, vertically stacked wells and any variation of 3D well spacing.

As described previously, a minimum curvature method of tracking TVD placement of a well can be impacted by errors. The errors may be due to the shape of the well not being a continuous arc, but rather a sequence of more aggressive arcs and relatively straight geometries. The order and placement of these sequences can have an impact on the accuracy of either TVD placement and azimuthal placement or left right accuracy of a well or both. This error can accumulate over a longer lateral length in addition to the ellipse of uncertainty caused by sensor accuracy. By leveraging the more accurate placement defined by the borehole estimators more accurate well geometry, a more accurate reference for spacing in all dimensions can be accomplished.

In addition to providing relative spacing cost curves to provide equal spacing on multiple lateral wells, a similar approach can be used to avoid collisions with historical wells or encroachment to lease lines. By using cost curves to provide variable distance driven penalties more flexibility can be given to allow optimal placement in complex situations. In some situations, a probability of placement of the existing well due to sensor accuracy and accumulation of error, combined with previously drilled wells that have a variety of accuracy issues due to older data and sensors may not provide an easy situation to approach for drilling anew well. In this case, a simple rule based planning system may result in no valid options to drill forward. By allowing a variable intensity penalty or cost system, a lowest risk option or highest value option can be chosen for drilling forward. Although this is discussed as a function of steering control system 168 as a real-time convergence planner selection effort, this approach can be used to iterate and develop the pre-drilling well plan under such complicated scenarios.

Figure 22:
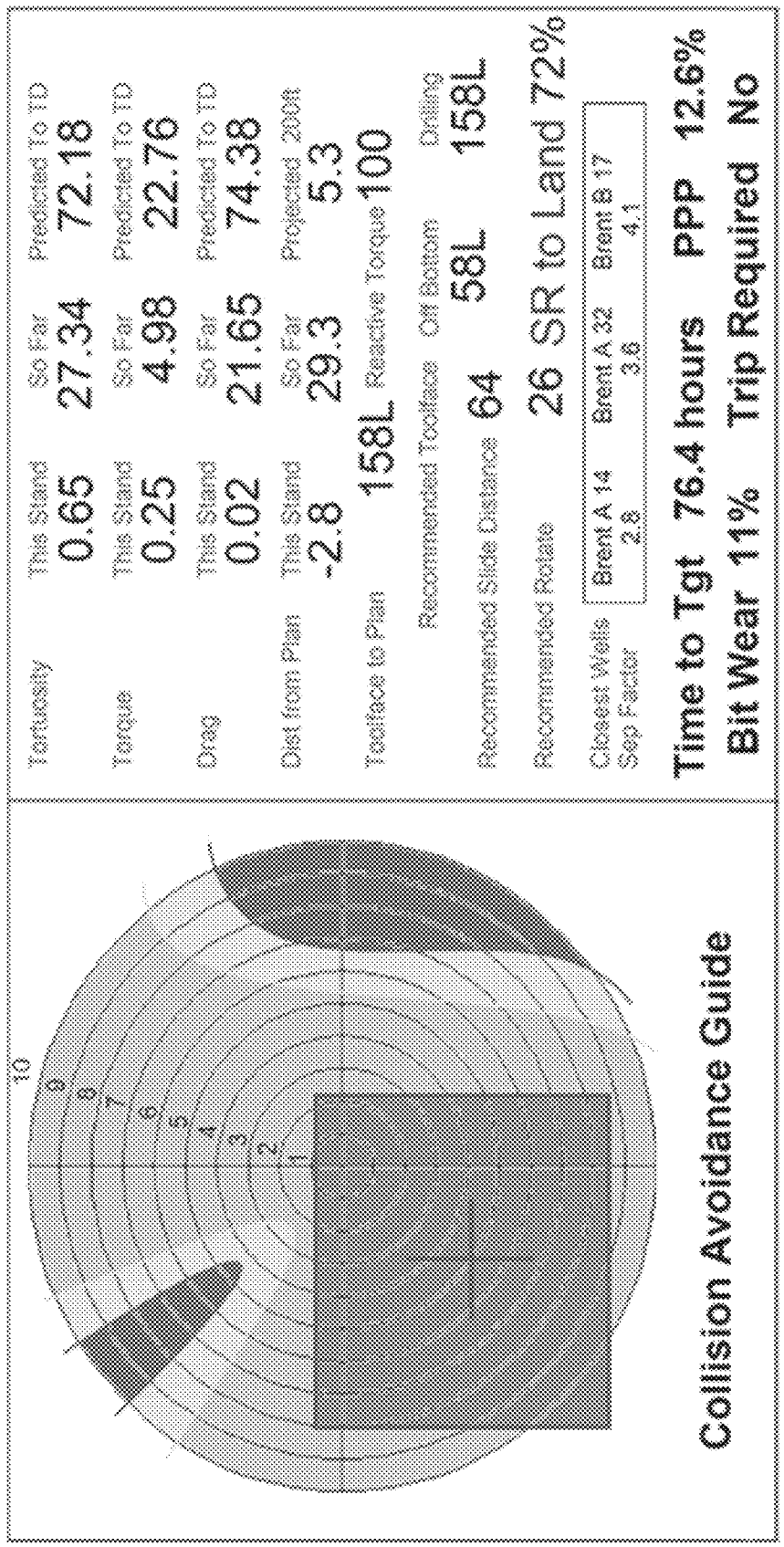
FIG. 22 depicts a user interface that displays PPP without delay during drilling.

In FIG. 22, a user interface that may be displayed and viewed during drilling is shown. In particular, the user interface in FIG. 22 shows a value for PPP that can be automatically updated without delay during drilling, and can be used to inform drilling decisions.

The user interface shown in FIG. 22 further includes a display of TTT ("Time to Tgt") during drilling of the well, which can also be automatically updated during the drilling of the well. As shown in FIG. 22, the user interface also includes a display showing a number of drilling parameters on the right hand side of the display. On the left hand of the display, the user interface can include a collision avoidance guide. The collision avoidance guide display may use different colors to visually indicate one or more directions for drilling that are likely to avoid any collision (such as with another well bore or a lease boundary line), or that one or more directions are likely to risk a collision. For example the dark areas on the right hand side of the circle and at about 130 degrees or so (e.g., the north-northwest portion of the circular display) may be displayed as red to indicate a risky direction, while the rectangular display superimposed on the circular display may be displayed as green to indicate that this direction for drilling presents little or no risk of collision.

In particular embodiments, the methods and systems for iterative well planning for optimized results disclosed herein may be provided as a service, such as from a drilling services provider such as Helmerich & Payne. The services provided may include management of the well planning process to maximize ROI for the well, as disclosed herein. The services provided may optimize the field layout for reduced cost and risk with increased production and cash flow. The services may include re-optimizing the well plan as drilling progresses and estimates of key parameters are updated and optimizing well plans at each site for reduced cost and reduced risk with increased production and cash flow. The services may further include re-optimization as drilling progresses and estimates of key parameters are updated. During drilling, the service may include estimating and displaying expected PPP and TTT, optimizing and guiding drilling decisions to maximize value and minimize risk; and recording and analyzing all drilling and geological parameters to inform the drilling of the present well and subsequent wells.

Figure 23:
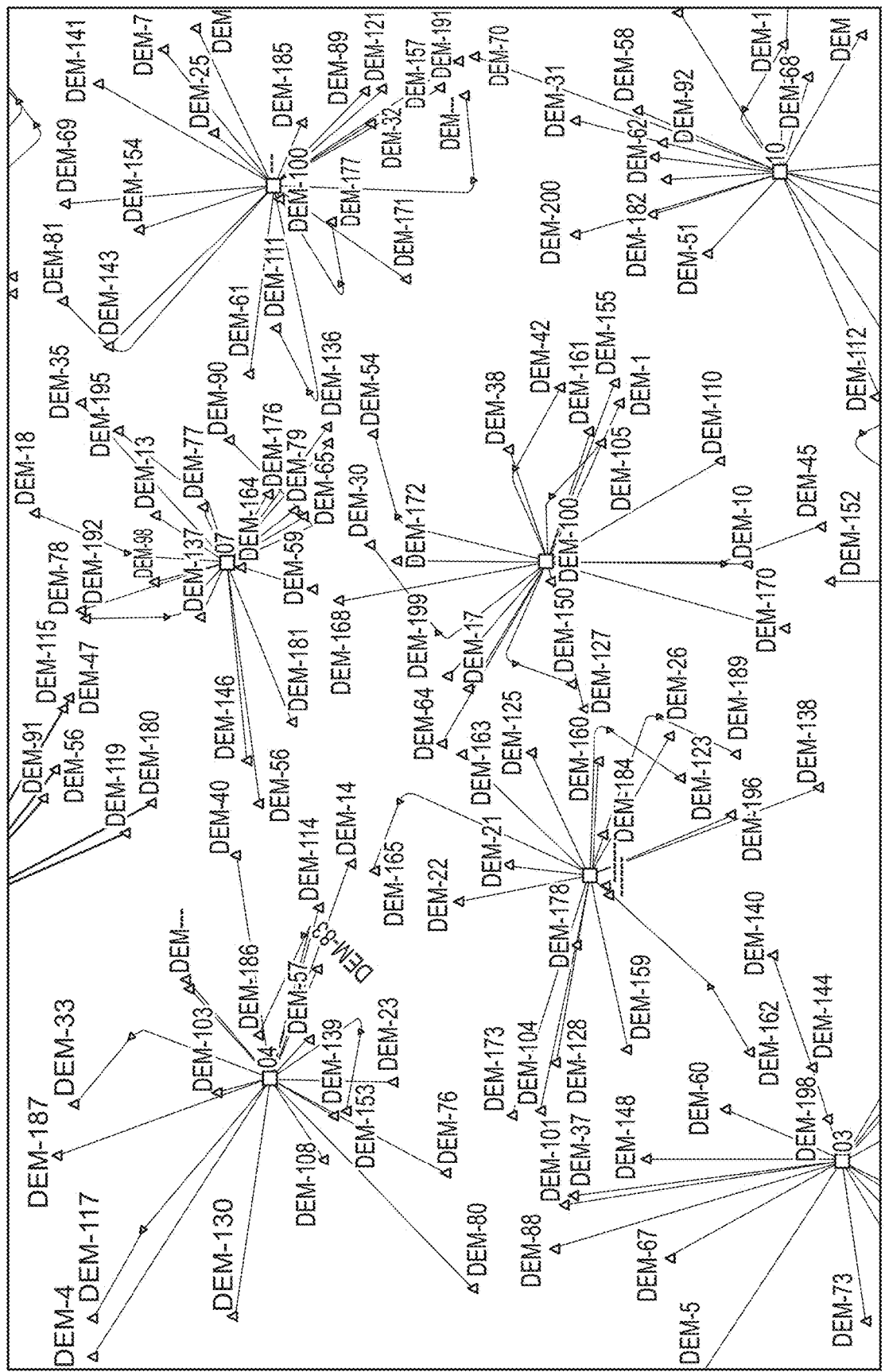
FIG. 23 depicts a field layout.

FIG. 23 depicts a field layout of a production field. The display in FIG. 23 may be provided to a user and may represent various types of drilling fields. The methods and systems for iterative well planning for optimized results disclosed herein may include providing estimates (e.g., estimated costs, estimated completion times) for various stages at the field level, such as for construction, pipe lines, drilling, completion, as well as providing planning for a field layout, such as by considering production, cash flow, cost, risk, and ease of service, including planning to optimize each of the various factors.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer system for drilling, the computer system comprising:
    a processor;
    a memory coupled to the processor, wherein the memory comprises a plurality of instructions executable by the processor, the plurality of instructions comprising instructions for:
    (a) obtaining information associated with a first well, wherein at least a portion of the first well has been drilled, and wherein the information associated with the first well comprises historical drilling data and bottom hole assembly (BHA) data;
    (b) obtaining information associated with a second well, wherein at least a portion of the second well remains to be drilled, and wherein the information associated with the second well comprises a well trajectory information and drilling equipment information;
    (c) generating, responsive to the information associated with the first well and the information associated with the second well, a plurality of well plans for a portion of the second well;
    (d) determining a time to target (TTT) for each of the plurality of alternative well plans;
    (e) selecting the well plan with a lowest TTT; and
    (f) sending one or more control signals to a control system of a drilling rig for drilling a portion of the second well in accordance with the selected well plan.

2. The computer system of claim 1, wherein the instructions further comprise instructions for:
    (g) during drilling of the portion of the second well, obtaining updated information associated with the second well;
    (h) generating, responsive to the information associated with the first well, the selected well plan, and the updated information associated with the second well, a plurality of updated well plans for the portion of the second well;
    (i) determining a TTT for each of the plurality of updated well plans;
    (j) selecting the updated well plan with the lowest TTT; and
    (k) sending one or more control signals to a control system of a drilling rig for drilling a portion of the second well in accordance with the selected updated well plan.

3. The computer system of claim 2 further comprising instructions for repeating steps (g)-(k) a plurality of times during drilling of the second well.

4. The computer system of claim 1 further comprising instructions for displaying a TTT associated with each of the selected well plan and the plurality of non-selected well plans, and wherein the information associated with each of the selected well plan and the plurality of non-selected well plans comprises an illustration of the well relative to one or more geological formations.

5. The computer system of claim 4 further comprising instructions for
generating a production percentage probability (PPP) for each of the selected well plan and the plurality of non-selected well plans; and
displaying the PPP associated with each of the selected well plan and the plurality of non-selected well plans.

6. The computer system of claim 5, wherein the step of selecting the well plan with the lowest TTT further comprises selecting the well plan with the highest PPP and a lowest TTT.

7. The computer system of claim 1 wherein the first well and the second well are located on a same pad.

8. The computer system of claim 1 further comprising instructions for displaying information associated the selected well plan.

9. The computer system of claim 1 further comprising instructions for displaying information associated the selected well plan and, relative to the selected well plan, information associated with a plurality of non-selected well plans.

10. The computer system of claim 1, wherein the TTT of each of the plurality of updated well plans is determined responsive to predicted stability of the BHA.

11. The computer system of claim 1, wherein the TTT of each of the plurality of updated well plans is determined responsive to data associated with a performance of the BHA in a portion of the well drilled previously.

12. The computer system of claim 1, further comprising instructions for:
responsive to a plurality of BHA bent housing angles, predicting a plurality of TTT values for the second well, wherein each of the TTT values corresponds to a BHA bent housing angle.

13. A method for well planning for optimized results, the method comprising:
obtaining, by a computer system, well plan information for at least one reference well previously drilled at a first location;
obtaining, by the computer system, from the well plan information, historical drilling data associated with the at least one reference well;
obtaining, by the computer system, from the well plan information, bottom hole assembly (BHA) data;
based on the historical drilling data and the BHA data, generating, by the computer system, a new well plan for a new well, wherein the new well is to be drilled at a second location and wherein the new well plan is adapted to optimize a time to target (TTT) of the new well;
generating, by the computer system, a plurality of alternative well plans for the new well;
determining an expected TTT for each of the plurality of alternative well plans; and
selecting an alternative well plan having a lowest TTT of the plurality of alternative well plans, wherein the TTT for each of the plurality of alternative well plans is determined responsive to at least a plurality of predicted friction factors, predicted wellbore pressures, drilling fluid, bottom hole assembly, drill bit, predicted drill bit wear, predicted rate of penetration, predicted trip time, survey information, reservoir model, and geological formation information.

14. The method of claim 13, wherein generating the new well plan further comprises:
prior to drilling a portion of the new well, obtaining, by the computer system, drilling equipment information and drilling parameter information for the portion of the new well and using the drilling equipment information and the drilling parameter information to optimize TTT of the new well.

15. The method of claim 13, wherein generating the new well plan further comprises:
modifying, by the computer system, the new well plan during drilling of the new well based on historical drilling data obtained during drilling a previous portion of the new well.

16. The method of claim 13, wherein the well plan information further comprises:
an indication of a well trajectory in three dimensions;
an indication of a well casing plan for the well;
an indication of a survey program for the well;
an indication of a drill bit for drilling the well;
an indication of operating parameters of a mud motor for the well; and
an indication of pump rates of drilling mud for drilling the well.

17. The method of claim 13, further comprising the step of drilling a portion of the new well in accordance with the new well plan.

18. The method of claim 13, further comprising determining, by the computer system, a predicted production percentage probability (PPP) for each of the plurality of alternative well plans, and wherein the selecting the alternative well plan further comprises selecting the alternative well plan with the highest PPP and a lowest TTT.

19. The method of claim 13 further comprising obtaining well plan information from a plurality of reference wells, wherein the well plan information for each of the plurality of reference wells comprises historical drilling data associated with a corresponding one of the plurality of reference wells, and further comprising weighting an emphasis to be given to at least one of the well plans of the plurality of reference wells.

20. The method of claim 13 further comprising drilling a portion of the new well in accordance with the selected alternative well plan.

21. The method of claim 13, wherein the BHA data includes seismic data for a previously drilled well.

22. A method of drilling a well, the method comprising:
obtaining, by a computer system, information associated with a first well, wherein at least a portion of the first well has been drilled;
obtaining, by the computer system, information associated with a second well, wherein at least a portion of the second well remains to be drilled, and wherein the information associated with the second well comprises a well plan that further comprises a planned well trajectory for the wellbore;
for each of a plurality of bent housing angles for each of a plurality of bottom hole assemblies (BHAs), determining, by the computer system, a corresponding predicted total time to target (TTT) to drill the portion of the second well that remains to be drilled; and
drilling a portion of the second well that remains to be drilled with the BHA corresponding to the lowest TTT.

23. The method of claim 22 wherein each TTT is responsive to predicted friction corresponding to each of the plurality of BHAs.

24. The method of claim 23, wherein each TTT is responsive to predicted time for a plurality of slide drilling segments and a plurality of rotary drilling segments.

25. The method of claim 24, wherein the BHA corresponding to the lowest TTT is not the BHA corresponding to the highest bent housing angle.

26. The method of claim 25, wherein each TTT is responsive to a predicted dogleg severity corresponding to a bent housing angle.

27. The method of claim 22, wherein the first well comprises a first portion of a well and the second well comprises a second, subsequent portion of the same well.

* * * * *